United States Patent
Alshin et al.

(10) Patent No.: US 9,014,260 B2
(45) Date of Patent: Apr. 21, 2015

(54) METHOD AND APPARATUS FOR ENCODING IMAGES, AND METHOD AND APPARATUS FOR DECODING ENCODED IMAGES

(75) Inventors: Alexander Alshin, Suwon-si (KR); Elena Alshina, Suwon-si (KR); Nikolay Shlyakhov, Suwon-si (KR); Woo-Jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 13/389,042

(22) PCT Filed: Aug. 6, 2010

(86) PCT No.: PCT/KR2010/005187
§ 371 (c)(1),
(2), (4) Date: Apr. 23, 2012

(87) PCT Pub. No.: WO2011/016702
PCT Pub. Date: Feb. 10, 2011

(65) Prior Publication Data
US 2012/0195379 A1    Aug. 2, 2012

(30) Foreign Application Priority Data
Aug. 6, 2009  (KR) .................. 10-2009-0072403

(51) Int. Cl.
*H04N 7/12* (2006.01)
*H04N 11/02* (2006.01)
(Continued)

(52) U.S. Cl.
CPC ............... *H04N 19/18* (2013.01); *H04N 19/17* (2013.01); *H04N 19/105* (2013.01); *H04N 19/176* (2013.01); *H04N 19/61* (2013.01); *H04N 19/136* (2013.01)

(58) Field of Classification Search
USPC .......................... 375/240.12, 240.01, 240.26
See application file for complete search history.

(56) References Cited

U.S. PATENT DOCUMENTS 5,534,925 A * 7/1996 Zhong ................. 348/384.1
6,282,322 B1 * 8/2001 Rackett ................. 382/248
(Continued)

FOREIGN PATENT DOCUMENTS

CN        1809165 A    7/2006
CN        1929613 A    3/2007
(Continued)

OTHER PUBLICATIONS

Video Transcoding Architectures, Vetro et al., IEEE Signal Processing Magazine, Mar. 2003.*
(Continued)

*Primary Examiner* — Geepy Pe
(74) *Attorney, Agent, or Firm* — Sughrue Mion, PLLC

(57) ABSTRACT

Methods and apparatuses for encoding and decoding an image are provided. The method of encoding an image includes: replacing a transformation coefficient having a low frequency component to be predicted from among transformation coefficients of a transformation block with a predetermined value; generating an incomplete residual block by inversely transforming the transformation block including the replaced transformation coefficient; and predicting the transformation coefficient having the low frequency component by using values of the incomplete residual block.

37 Claims, 26 Drawing Sheets

(51) Int. Cl.
*H04N 11/04* (2006.01)
*H04N 19/18* (2014.01)
*H04N 19/17* (2014.01)
*H04N 19/105* (2014.01)
*H04N 19/176* (2014.01)
*H04N 19/61* (2014.01)
*H04N 19/136* (2014.01)

(56) References Cited

U.S. PATENT DOCUMENTS

| | | | |
|---|---|---|---|
| 6,498,815 | B2 | 12/2002 | Kleihorst et al. |
| 6,668,095 | B2 | 12/2003 | Rackett |
| 7,738,714 | B2 | 6/2010 | Lee et al. |
| 8,059,717 | B2 | 11/2011 | Saigo et al. |
| 8,155,181 | B2 | 4/2012 | Han et al. |
| 8,194,989 | B2 | 6/2012 | Lee et al. |
| 2006/0159354 | A1 | 7/2006 | Kim et al. |
| 2007/0058715 | A1 | 3/2007 | Kim et al. |
| 2007/0110327 | A1* | 5/2007 | Han ............ 382/251 |
| 2008/0159389 | A1* | 7/2008 | Lee et al. ......... 375/240.12 |
| 2010/0014578 | A1* | 1/2010 | Lancaster et al. ...... 375/240.01 |

FOREIGN PATENT DOCUMENTS

| | | |
|---|---|---|
| CN | 1933601 A | 3/2007 |
| CN | 1956546 A | 5/2007 |
| CN | 101467461 A | 6/2009 |
| KR | 10-2000-0053028 A | 8/2000 |
| KR | 10-0346728 B1 | 10/2002 |
| KR | 10-2008-0018469 A | 2/2008 |
| KR | 10-2008-0064008 A | 7/2008 |
| KR | 10-2008-0082147 A | 8/2008 |
| WO | 2008/123657 A1 | 10/2008 |

OTHER PUBLICATIONS

DCT Coefficient Prediction for JPEG Image Coding, Lakhani, IEEE International Conference on Image Processing, Sep. 2007.*

New DCT-domain transcoding using split and merge technique, Kai-Tat et al., IEEE International Conference on Image Processing, Sep. 2003.*

International Search Report [PCT/ISA/210], dated Feb. 22, 2011, from the International Searching Authority, issued in counterpart International Application No. PCT/KR2010/005187.

Written Opinion of the International Searching Authority[PCT/ISA/237], dated Feb. 22, 2011, issued in counterpart International Application No. PCT/KR2010/005187.

Communication dated Feb. 8, 2014 issued by the State Intellectual Property Office of the People's Republic of China in counterpart Chinese Patent Application No. 201080034983.0.

Communication, Issued by the State Intellectual Property Office of P.R. China, Dated Sep. 15, 2014, in counterpart Chinese application No. 201080034983.0.

* cited by examiner

FIG. 7
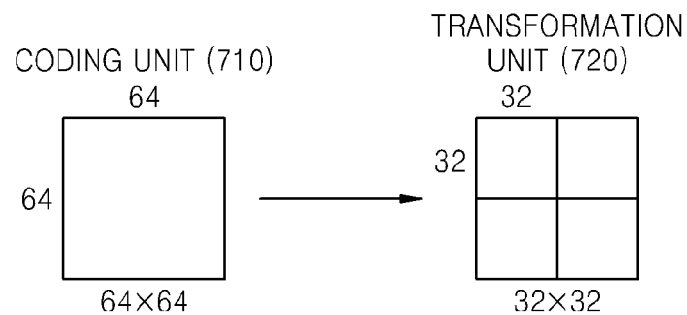
FIG. 8
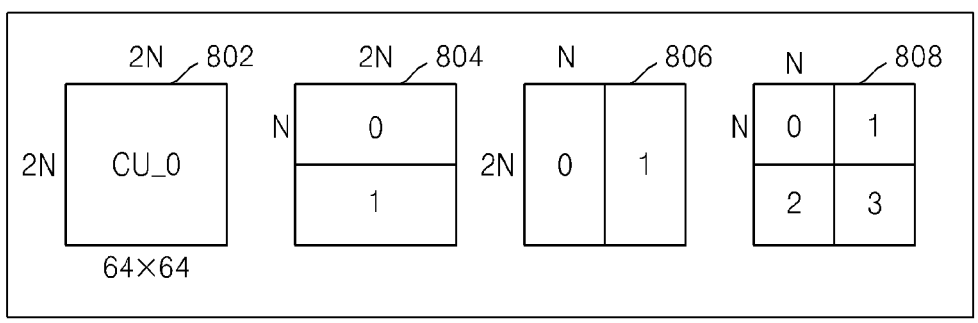
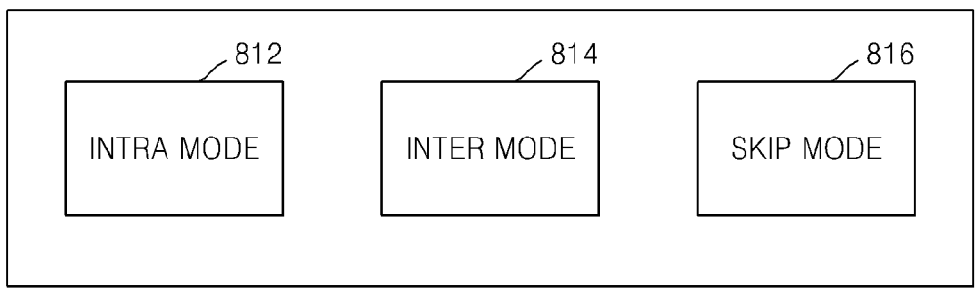
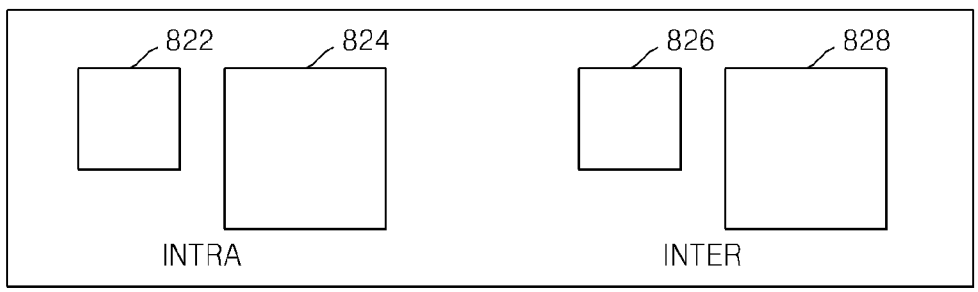

CODING UNIT (1010)

PREDICTION UNIT (1060)

FIG. 16

| res(0,0) | res(1,0) | · · | · · | res(4,0) |
|---|---|---|---|---|
| res(0,1) | | | | |
| | | · ˙ | | |
| · | | · | | |
| · | | | | |
| res(0,4) | | | | res(4,4) |

FIRST RESIDUAL BLOCK (1410)

| c(0,0) | c(1,0) | · · | · · | c(4,0) |
|---|---|---|---|---|
| c(0,1) | | | | |
| · | | · ˙ | | |
| · | | · | | |
| · | | | | |
| c(0,4) | | | | c(4,4) |

TRANSFORMATION BLOCK (1420)

| f(0,0) | f(1,0) | · · | · · | f(4,0) |
|---|---|---|---|---|
| f(0,1) | | | | |
| · | | · ˙ | | |
| · | | · | | |
| · | | | | |
| f(0,4) | | | | f(4,4) |

SECOND RESIDUAL BLOCK (1430)

| $fdp_{00}$ | $fdp_{10}$ | · · | · · | $fdp_{40}$ |
|---|---|---|---|---|
| $fdp_{01}$ | | | | |
| · | | · ˙ | | |
| · | | · | | |
| · | | | | |
| $fdp_{04}$ | | | | |

PREDICTOR (1440)

| c(0,0)− fdp$_{00}$ | fdp$_{10}$ | c(2,0)− fdp$_{20}$ | c(3,0) | c(4,0) |
|---|---|---|---|---|
| c(0,1) | | | | . |
| . | | . | | . |
| . | | | | |
| c(0,4) | | | | c(4,4) |

1605 points to the top-left bolded cells. 1600 labels the grid.

FIG. 20

| c(0,0)−<br>$fdp_{00}$ | c(1,0) | . . | . . | c(4,0) |
|---|---|---|---|---|
| c(0,1)−<br>$fdp_{01}$ | | | | . |
| c(0,2)−<br>$fdp_{02}$ | | . . | | . |
| c(0,3) | | | | |
| c(0,4) | | | | c(4,4) |

| c(0,0)− fdp$_{00}$ — 2005 | c(1,0) | . . | . . | c(4,0) |
|---|---|---|---|---|
| c(0,1) | | | | |
| . . . | | . . . | | |
| . . . | | | | |
| c(0,4) | | | | c(4,4) — 2000 |

FIG. 27

| $c(0,0)-$ $fdp_{00}$ | $c(1,0)-$ $fdp_{10}$ | $c(2,0)-$ $fdp_{20}$ | $c(3,0)$ | $c(4,0)$ |
|---|---|---|---|---|
| $c(0,1)-$ $fdp_{01}$ | | | | |
| $c(0,2)-$ $fdp_{02}$ | | | | |
| $c(0,3)$ | | | | |
| $c(0,4)$ | | | | $c(4,4)$ |

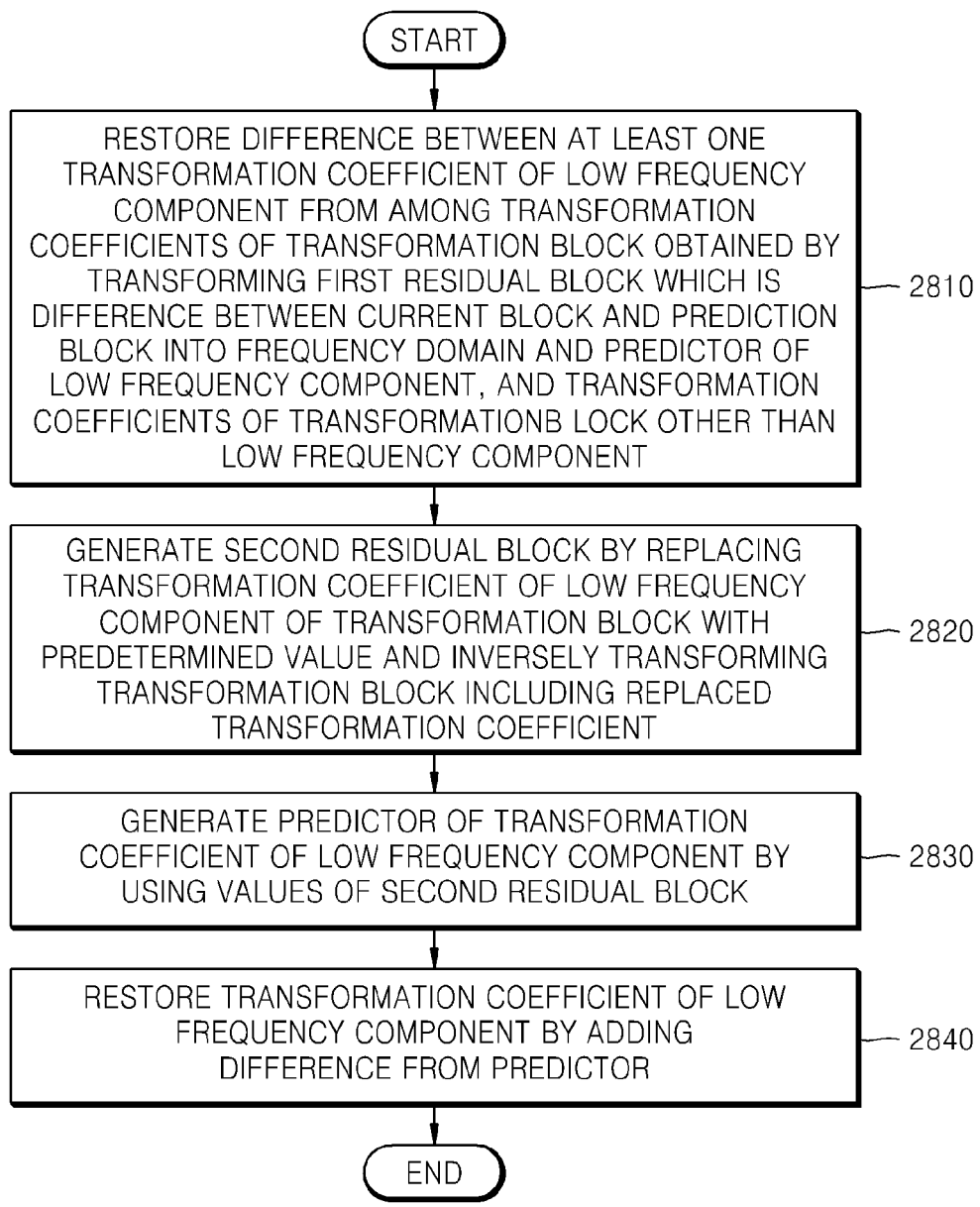

METHOD AND APPARATUS FOR ENCODING IMAGES, AND METHOD AND APPARATUS FOR DECODING ENCODED IMAGES

CROSS-REFERENCE TO RELATED PATENT APPLICATION

This application is a National Stage application under 35 U.S.C. §371 of PCT/KR2010/005187 filed on Aug. 6, 2010, which claims priority from Korean Patent Application No. 10-2009-0072403, filed on Aug. 6, 2009 in the Korean Intellectual Property Office, all the disclosures of which are incorporated herein in their entireties by reference.

BACKGROUND

1. Field

Apparatuses and methods consistent with exemplary embodiments relate to encoding and decoding an image, and more particularly, to encoding and decoding an image which may improve image compression efficiency by predicting image data in a frequency domain.

2. Description of the Related Art

As hardware for reproducing and storing high resolution or high quality video content is being developed and supplied, a need for a video codec for efficiently encoding or decoding the high resolution or high quality video content is increasing. One principle of image compression is to reduce the amount of image data to be encoded by generating a prediction value of the image data to be encoded and encoding a difference between the image data and the prediction value. A codec such as moving picture expert group (MPEG)-4 or H.264/MPEG-4 advanced video coding (AVC) performs encoding by generating a prediction block of a current block through intra prediction or inter prediction in a time domain and transforming and quantizing a residual value that is a difference between the current block and the prediction block.

SUMMARY

Aspects of one or more exemplary embodiments provide a method and apparatus for predicting a transformation coefficient in a frequency domain.

Aspects of one or more exemplary embodiments provide methods and apparatuses for encoding and decoding an image which may improve image compression efficiency by predicting a transformation coefficient in a frequency domain.

According to an aspect of an exemplary embodiment, there is provided a method of encoding an image, the method including: generating a first transformation block by transforming a first residual block that is a difference between a current block to be encoded and a prediction block into a frequency domain; generating a second residual block by inversely transforming a second transformation block that is obtained by replacing a transformation coefficient of a first region from among transformation coefficients of the first transformation block with a predetermined value; generating a predictor of the transformation coefficient of the first region by using the second residual block; and encoding an input image by generating a predicted first region by using the predictor and the transformation coefficient of the first region and generating a third transformation block including the predicted first region.

According to an aspect of another exemplary embodiment, there is provided a method of decoding an image, the method including: restoring an original transformation coefficient of a second region other than a transformation coefficient of a first region and a difference between the transformation coefficient of the first region and a predictor of the transformation coefficient of the first region from among transformation coefficients of a transformation block that is obtained by transforming a first residual block which is a difference between a current block and a prediction block into a frequency domain; replacing the transformation coefficient of the first region with a predetermined value, and generating a second residual block by using a replaced transformation block including the original transformation coefficient of the second region and the replaced transformation coefficient of the first region; generating a predictor of the transformation coefficient of the first region by using the second residual block; and restoring the transformation coefficient of the first region by adding the difference from the predictor and the transformation coefficient of the first region.

According to an aspect of another exemplary embodiment, there is provided an apparatus for encoding an image, the apparatus including: a transformer that generates a transformation block by transforming a first residual block which is a difference between a current block to be encoded and a prediction block into a frequency domain; a transformation coefficient predictor that replaces a transformation coefficient of a first region from among transformation coefficients of the transformation block with a predetermined value, generates a second residual block by using a replaced transformation block including an original transformation coefficient of a second region other than the first region and the replaced transformation coefficient of the first region, and generates a predictor of the transformation coefficient of the first region by using the second residual block; a subtractor that calculates a difference between the transformation coefficient of the first region and the predictor of the transformation coefficient of the first region; and an encoder that encodes the transformation block including the original transformation coefficient of the second region and the difference.

According to an aspect of another exemplary embodiment, there is provided an apparatus for decoding an image, the apparatus including: a transformation coefficient information restorer that restores an original transformation coefficient of a second region other than a transformation coefficient of a first region and a difference between the transformation coefficient of the first region from among transformation coefficients of a transformation block that is obtained by transforming a first residual block which is a difference between a current block and a prediction block into a frequency domain and a predictor of the transformation coefficient of the first region; a transformation coefficient predictor that replaces the transformation coefficient of the first region with a predetermined value, generates a second residual block by using a replaced transformation block including the original transformation coefficient of the second region and the replaced transformation coefficient of the first region, and generates the predictor of the transformation coefficient of the first region by using the second residual block; and an adder that restores the transformation coefficient to be predicted by adding the difference from the predictor value.

According to an aspect of another exemplary embodiment, there is provided a method of decoding an image, the method including: receiving information about a prediction region and about a first transformation block that includes the prediction region and is subjected to frequency transformation; generating a second transformation block by replacing a transformation coefficient of the prediction region of the first transformation block extracted from the information about the prediction region with a predetermined value; generating a residual block by inversely transforming the second transformation block; generating a predictor of the transformation coefficient of the prediction region by using the residual block; and restoring the second transformation block by adding the predictor to the prediction region of the first transformation block.

According to an aspect of another exemplary embodiment, there is provided an apparatus for decoding an image, the apparatus including: an information unit which receives information about a prediction region and about a first transformation block that comprises the prediction region and is subjected to frequency transformation; a transformation coefficient predictor which generates a second transformation block by replacing a transformation coefficient of the prediction region of the first transformation block based on the received information about the prediction region with a predetermined value, generates a residual block by inversely transforming the generated second transformation block, and generates a predictor of the transformation coefficient of the prediction region by using the generated residual block; and an adder which restores the second transformation block by adding the generated predictor to the prediction region of the first transformation block.

According to the present invention, since a transformation coefficient is predicted in a frequency domain and only a difference between a predictor and an actual transformation coefficient is encoded, image compression efficiency may be improved.

BRIEF DESCRIPTION OF THE DRAWINGS

FIG. 7 is a diagram illustrating a relationship between a coding unit and a transformation unit, according to an exemplary embodiment;

FIG. 8 is a diagram illustrating coding information according to depths, according to an exemplary embodiment;

FIG. 16 is a reference diagram for explaining nomenclatures of parameters used to predict a transformation coefficient, according to an exemplary embodiment;

FIG. 18 is a diagram illustrating a transformation block encoded according to a prediction result of a prediction coefficient in the transformation coefficient prediction mode 0 FDP_mode_0, according to an exemplary embodiment;

FIG. 20 is a diagram illustrating a transformation block encoded according to a prediction result of a transformation coefficient in the transformation coefficient prediction mode 1 FDP_mode_1, according to an exemplary embodiment;

FIG. 22 is a diagram illustrating a transformation block encoded according to a prediction result of a transformation coefficient in the transformation coefficient prediction mode 2 FDP_mode_2, according to an exemplary embodiment;

FIG. 27 is a diagram illustrating a transformation block encoded according to a prediction result of a transformation coefficient in the transformation coefficient prediction mode 3 FDP_mode_3, according to an exemplary embodiment;

FIG. 30 is a flowchart illustrating a method of decoding an image, according to an exemplary embodiment.

DETAILED DESCRIPTION OF EXEMPLARY EMBODIMENTS

Figure 1:
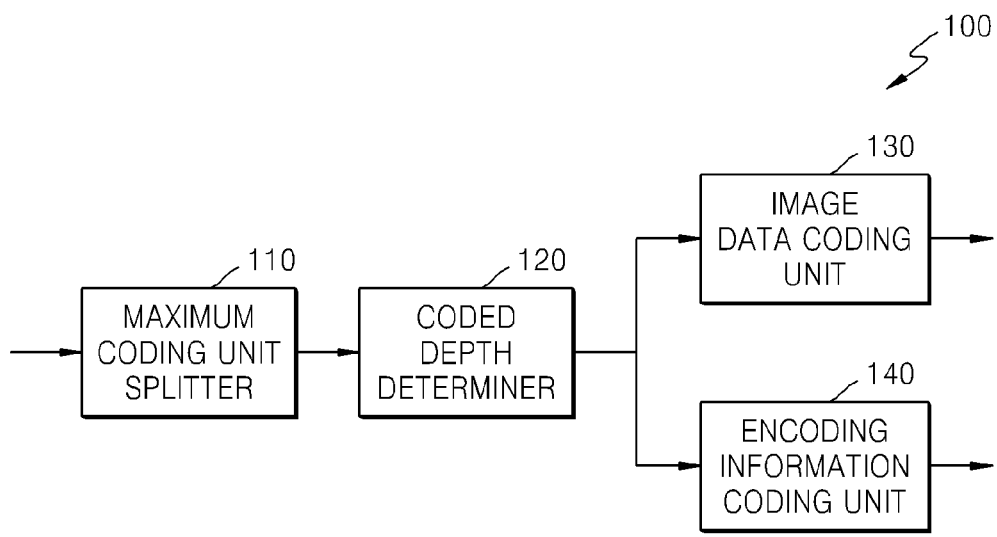
FIG. 1 is a block diagram illustrating an apparatus for encoding an image, according to an exemplary embodiment.

Exemplary embodiments will now be described more fully with reference to the accompanying drawings, in which like reference numerals refer to like elements throughout.

FIG. 1 is a block diagram of an apparatus 100 for encoding an image, according to an exemplary embodiment. The apparatus 100 includes a maximum coding unit splitter 110, a coded depth determiner 120, an image data encoding unit 130, and an encoding information coding unit 140.

The maximum coding unit splitter 110 splits a current picture or a current slice based on a maximum coding unit that is a coding unit having a maximum size. The current picture or the current slice is split into at least one maximum coding unit. A maximum coding unit may be a data unit having a size of 32×32, 64×64, 128×128, 256×256, etc., wherein a shape of the data unit ma be a square having a width and length in squares of 2 which are greater than 8. Image data may be output to the coded depth determiner 120 according to the at least one maximum coding unit.

A coding unit may be represented by using a maximum coding unit and a depth. The maximum coding unit is a coding unit having a largest size from among coding units of the current picture, and the depth is the number of times a coding unit is spatially split from the maximum coding unit. As the depth deepens, coding units according to depths may be split from the maximum coding unit to a minimum coding unit. A depth of the maximum coding unit is an uppermost depth and a depth of the minimum coding unit is a lowermost depth. Since a size of a coding unit having each depth decreases as the depth deepens, a coding unit having an upper depth may include a plurality of coding units having lower depths.

As described above, the image data of the current picture is split into the maximum coding units according to a maximum size of the coding unit, and each of the maximum coding units may include coding units that are split according to depths. Since the maximum coding unit is split according to depths, image data of a spatial domain included in the maximum coding unit may be hierarchically classified according to depths.

A maximum depth and a maximum size of a coding unit, which limit a total number of times a height and a width of the maximum coding unit are hierarchically split, may be predetermined. Such a maximum coding unit and a maximum depth may be set in units of pictures or slices. That is, pictures or slices have different maximum coding units and maximum depths, and a size of a minimum coding unit included in a maximum coding unit may be variously set according to a maximum depth. Since a maximum coding unit and a maximum depth may be variously set for every picture or slice, an image of a flat region may be encoded by using a larger maximum coding unit to improve compression efficiency, and an image having a higher complexity may be encoded by using a coding unit having a smaller size to improve compression efficiency.

The coded depth determiner 120 determines a depth for every maximum coding unit. The depth may be determined based on a rate-distortion (R-D) cost calculation. In detail, the coded depth determiner 120 encodes at least one split region obtained by splitting a region of the maximum coding unit according to depths, and determines a depth at which finally encoded image data is to be output according to the at least one split region. In other words, the coded depth determiner 120 encodes the image data in coding units according to depths for every maximum coding unit, selects a depth having the least encoding error, and determines the selected depth as a coded depth. The determined maximum depth is output to the encoding information coding unit 140, and the image data according to the maximum coding unit is output to the image data encoding unit 130.

The image data in the maximum coding unit is encoded based on the coding units having at least one depth equal to or below the maximum depth, and results of encoding the image data are compared based on each of the coding units. A depth having the least encoding error may be selected after comparing encoding errors of the coding units. At least one coded depth may be selected for every maximum coding unit.

The size of the maximum coding unit is split as a coding unit is hierarchically split according to depths and as the number of coding units increases. Also, even if coding units have the same depth in one maximum coding unit, it is determined whether to split each of the coding units having the same depth to a lower depth after measuring an encoding error of the image data of each coding unit, separately. Accordingly, even when image data is included in one maximum coding unit, the image data is split into regions according to the depths, the encoding errors may differ according to regions in the one maximum coding unit, and thus the coded depths may differ according to regions in the image data. Accordingly, one or more coded depths may be determined in one maximum coding unit, and the image data of the maximum coding unit may be split according to coding units of at least one coded depth.

Accordingly, the coded depth determiner 120 may determine coding units having a tree structure included in the maximum coding unit. The 'coding units having a tree structure' include coding units having a depth determined to be the coded depth, from among all coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth is an index related to the number of splitting times from a maximum coding unit to a minimum coding unit. A first maximum depth may denote a total number of splitting times from the maximum coding unit to the minimum coding unit. A second maximum depth may denote a total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. In this case, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Also, prediction encoding and frequency transformation of the maximum coding unit may be performed based on coding units according to depths for every depth less than a maximum depth. In other words, the apparatus 100 may perform a plurality of processes for encoding an image based on processing units having various sizes and various shapes. In order to encode image data, processes such as prediction, frequency transformation, and entropy encoding are performed. Processing units having the same size may be used in all of the steps, or processing units having different sizes may be used according to the processes.

For example, in order to predict a coding unit, the apparatus 100 may select a processing unit different from the coding unit. Prediction encoding in the maximum coding unit may be performed based on a coding unit having a coded depth, that is, a coding unit which is no longer split. A data unit that is a basis unit for prediction encoding is referred to as a 'prediction unit'. A partition obtained by splitting the prediction unit may include a prediction unit and a data unit obtained by splitting at least one of a height and a width of the prediction unit. For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or a width of the prediction unit, partitions obtained by asymmetrically splitting the height or the width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. When a plurality of prediction units exist in a coding unit, encoding may be independently performed on each of the prediction units and a prediction mode having a least encoding error may be selected.

Also, the apparatus 100 may perform frequency transformation on image data based on a coding unit and a data unit having a size different from that of the coding unit. In order to perform frequency transformation on a coding unit, frequency transformation may be performed based on a data unit having a size equal to or less than that of the coding unit. A processing unit, which is a basis unit for frequency transformation, is referred to as a 'transformation unit'. A transformation unit may be recursively split into transformation units having smaller sizes and residual data of a coding unit may be divided according to transformation units according to a tree structure of transformation depths.

A transformation depth indicating the number of splitting times to reach a transformation unit by splitting a height and a width of a coding unit may also be set in the transformation unit. For example, in a current coding unit of 2N×2N, a transformation depth may be 0 when the size of a transformation unit is also 2N×2N, may be 1 when the size of the transformation unit is N×N, and may be 2 when the size of the transformation unit is thus N/2×N/2. That is, the transformation unit may be set according to a tree structure according to transformation depths. Encoding information according to coded depths requires information related to prediction and information related to frequency transformation as well as the coded depth. Accordingly, the coded depth determiner 120 may determine a coding unit having a least encoding error, a partition type obtained by splitting a prediction unit of a coded depth into prediction unit partitions, prediction modes according to the prediction units, and a size of a transformation unit for frequency transformation.

The coded depth determiner 120 may measure encoding errors of coding units according to depths by using an R-D optimization method based on a Lagrangian multiplier and determine a split type of a maximum coding unit having an optimum encoding error. In other words, the coded depth determiner 120 may determine whether a maximum coding unit is to be split to a plurality of sub-coding units, and sizes of the plurality of sub-coding units vary according to depths.

The image data encoding unit 130 encodes the image data of the maximum coding unit based on at least one coded depth determined by the coded depth determiner 120 and outputs a bitstream. Since the coded depth determiner 120 already performs encoding in order to measure a minimum encoding error, an encoded data stream may be output.

The encoding information coding unit 140 encodes information about encoding modes according to depths for every maximum coding unit and outputs a bitstream based on at least one coded depth determined by the coded depth determiner 120. The information about the encoding modes according to the depths may include information about a coded depth, information about a partition type that may split a prediction unit of a coded depth into prediction unit partitions, information about prediction modes according to prediction units, and information about a size of a transformation unit.

The information about the coded depth may be defined by using split information according to depths, which indicates whether encoding is performed on coding units of a lower depth instead of a current depth. If the current depth of the current coding unit is a coded depth, since image data in the current coding unit is encoded and output according to the current depth, the split information of the current depth may be defined not to split the current coding unit to a lower depth. On the other hand, if the current depth is not a coded depth, since the encoding is performed on the coding unit of the lower depth, the spa information may be defined to split the current coding unit to obtain the coding units of the lower depth.

If the current depth is not a coded depth, encoding is performed on the coding unit that is split to the coding unit of the lower depth. Since at least one coding unit of the lower depth exists in one coding unit of the current depth, the encoding may be repeatedly performed on each coding unit of the lower depth, and thus the encoding may be recursively performed for the coding units of the same depth.

Since at least one coded depth of a tree structure is determined in one maximum coding unit and information about at least one encoding mode is determined for every coded depth, the information about the at least one encoding mode may be determined for one maximum coding unit. Also, since the image data of the maximum coding unit is hierarchically split according to depths and a coded depth varies according to locations, information about the encoding mode and the coded depth may be set for the image data.

Accordingly, the encoding information coding unit 140 may assign encoding information about a corresponding coded depth and an encoding mode to at least one of the coding unit, the prediction unit, and a minimum unit included in the maximum coding unit.

The minimum unit is a rectangular data unit obtained by splitting the minimum coding unit of the lowermost depth by 4. Alternatively, the minimum unit may be a maximum rectangular data unit that may be included in all of the coding units, prediction units, partition units, and transformation units included in the maximum coding unit. For example, the encoding information output through the image data encoding unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, information about a reference image index of the inter mode, information about a motion vector, information about a chroma component of an intra mode, and information about an interpolation method of the intra mode. Also, information about a maximum size of the coding unit defined according to pictures, slices, or GOPs, and information about a maximum depth may be inserted into a header of a bitstream.

According to an exemplary embodiment of the apparatus 100, a coding unit is a coding unit obtained by splitting at least one of a height and a width of a coding unit of an upper depth by two. That is, if a size of a coding unit of a current depth (k) is 2N×2N, a size of a coding unit of a lower depth (k+1) is N×N. Accordingly, a current coding unit having a size of 2N×2N may include up to 4 coding units having lower depths having sizes of N×N.

Accordingly, the apparatus 100 may form coding units having a tree structure by determining a coding unit having an optimum shape and an optimum size for every maximum coding unit based on a maximum depth and a size of a maximum coding unit determined by considering characteristics of a current picture. Also, since encoding may be performed in various prediction modes and frequency transformation methods on each maximum coding unit, an optimum encoding mode may be determined by considering characteristics of coding units having various sizes.

If an image having very high resolution or a very large data amount is encoded in macroblocks having sizes of 16×16, the number of macroblocks per picture may be too much. Accordingly, the number of pieces of compressed information generated for each macroblock increases, and thus it is difficult to transmit the compressed information and data compression efficiency decreases. Accordingly, since a maximum size of a coding unit is increased by using a size of an image and a coding unit is adjusted by considering characteristics of the image, the apparatus 100 of FIG. 1 may improve image compression efficiency.

Figure 2:
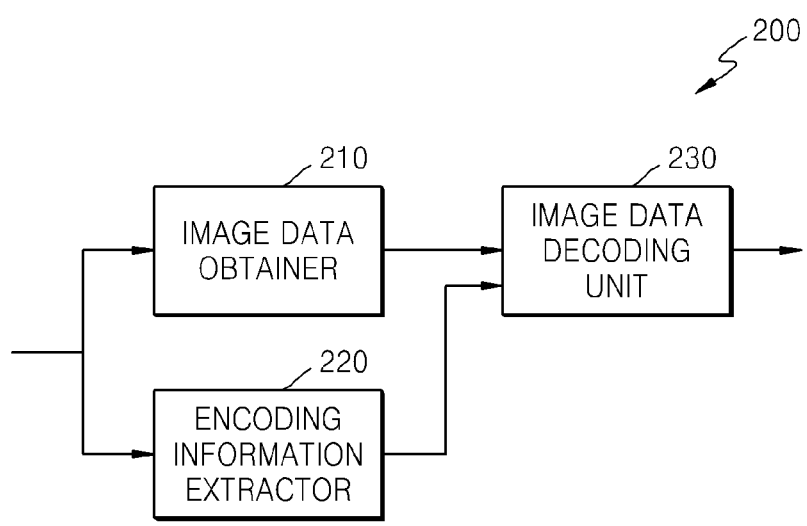
FIG. 2 is a block diagram illustrating an apparatus for decoding an image, according to an exemplary embodiment.

FIG. 2 is a block diagram illustrating an apparatus 200 for decoding an image, according to an exemplary embodiment.

Referring to FIG. 2, the apparatus 200 includes an image data obtainer 210, an encoding information extractor 220, and an image data decoding unit 230. Various terms such as a coding unit, a depth, a prediction unit, a transformation unit, and information about various encoding modes for processing the apparatus 200 are the same as or similar to those of the apparatus 100 described with reference to FIG. 1. The image data obtainer 210 parses a bitstream received by the apparatus 200, obtains image data according to maximum coding units, and outputs the image data to the image data decoding unit 230. The image data obtainer 210 may extract information about a maximum coding unit of a current picture or slice from a header of the current picture or slice. The apparatus 200 decodes the image data according to the maximum coding units.

The encoding information extractor 220 parses the bitstream received by the apparatus 200, and extracts information about an encoding mode and a coded depth about coding units in a tree structure according to maximum coding units from the header of the current picture. The information about the encoding mode and the coded depth is output to the image data decoding unit 230.

The information about the encoding mode and the coded depth according to the maximum coding units may be set for information about one or more coded depths, and the information about the encoding mode according to coded depths may include information about a partition type of a coding unit, information about a prediction mode, and information about a size of a transformation unit. Also, split information according to depths may be extracted as the information about the coded depth.

The information about the coded depth and the encoding mode according to the maximum coding units extracted by the encoding information extractor 220 is information about a coded depth and an encoding mode determined to generate a minimum encoding error when an encoder, such as the apparatus 100 illustrated in FIG. 1, repeatedly performs encoding on coding units according to depths in the maximum coding units. Accordingly, the apparatus 200 may restore an image by decoding the image data according to the coded depth and the encoding mode that generates the minimum encoding error.

Since the information about the coded depth and the encoding mode may be assigned to a predetermined data unit from among a coding unit, a prediction unit, and a minimum unit, the encoding information extractor 220 may extract the information about the coded depth and the encoding mode according to the predetermined data units. When the information about the coded depth and the encoding mode according to the maximum data units is recorded according to the predetermined data units, the predetermined data units to which the same information about the coded depth and the encoding mode is assigned may be inferred to be data units included in the same maximum coding unit.

The image data decoding unit 230 restores the current picture by decoding the image data in each maximum coding unit based on the information about the coded depth and the encoding mode according to the maximum coding units. In other words, the image data decoding unit 230 may decode the image data based on the extracted information about the partition type, the prediction mode, and the transformation unit for each coding unit from among the coding units having the tree structure included in each maximum coding unit. A decoding process may include a prediction process including intra prediction and motion compensation, and an inverse transformation process.

The image data decoding unit 230 may perform intra prediction or motion compensation according to a partition and a prediction mode of each coding unit, based on the information about the partition type and the prediction mode of the prediction unit of the coding unit according to each coded depth. Also, the image data decoding unit 230 may perform inverse transformation according to each transformation unit in the coding unit, based on the information about the size of the transformation unit of the coding unit according to coded depths, so as to perform the inverse transformation according to maximum coding units.

The image data decoding unit 230 may determine a coded depth of a current maximum coding unit by using split information according to depths. If the split information indicates that image data is no longer split in the current depth, the current depth is a coded depth. Accordingly, the image data decoding unit 230 may decode the image data of the coding unit having each coded depth in the current maximum coding unit by using the information about the partition type of the prediction unit, the prediction mode, and the size of the transformation unit for each coding unit having the coded depth, and output the image data of the current maximum coding unit. In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoding unit 230 in the same encoding mode.

The apparatus 200 may recursively perform encoding for each maximum coding unit, obtain information about a coding unit which generates a minimum encoding error, and use the information to decode the current picture. That is, decoding of image data may be performed in an optimum coding unit for every maximum coding unit. Accordingly, even image data having high resolution or a large data amount may be decoded and restored efficiently by using an encoding mode and a size of a coding unit adaptively determined according to characteristics of the image data by using information about an optimum encoding mode transmitted from an encoder.

Figure 3:
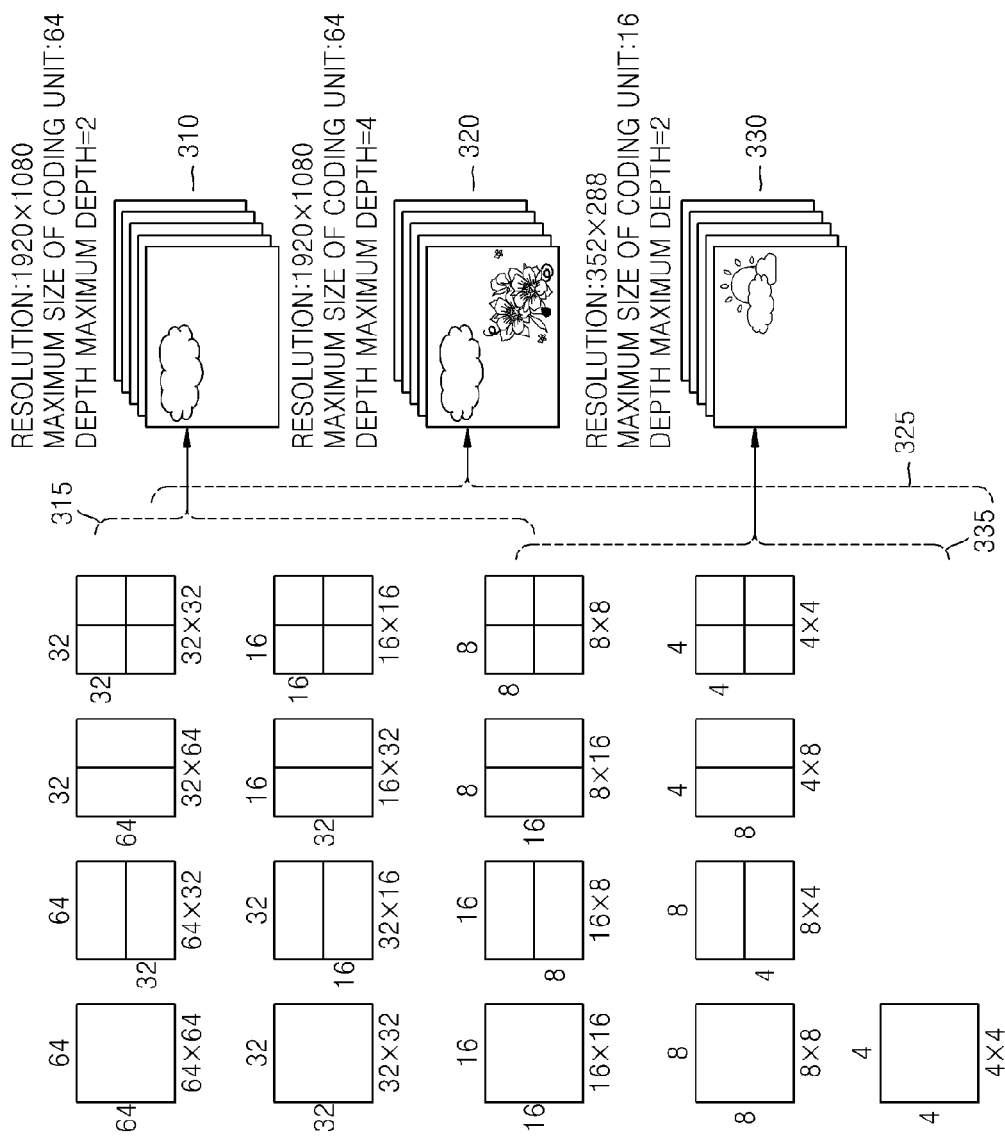
FIG. 3 is a diagram illustrating a hierarchical coding unit according to an exemplary embodiment.

FIG. 3 is a diagram illustrating a hierarchical coding unit according to an exemplary embodiment.

Referring to FIG. 3, a hierarchical coding unit may include coding units having sizes which are expressed in width× height, of 64×64, 32×32, 16×16, 8×8 and 4×4. A coding unit of 64×64 may be split into partitions of 64×64, 64×32, 32×64, and 32×32, and a coding unit of 32×32 may be split into partitions of 32×32, 32×16, 16×32, and 16×16, a coding unit of 16×16 may be split into partitions of 16×16, 16×8, 8×16, and 8×8, and a coding unit of 8×8 may be split into partitions of 8×8, 8×4, 4×8, and 4×4.

In FIG. 3, in video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. A maximum depth shown in FIG. 3 denotes a total number of splitting times from a maximum coding unit to a minimum decoding unit.

If a resolution is high or a data amount is large, a maximum size of a coding unit may be large so as to not only improve encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths deepen to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths deepen to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths deepen to 3 layers by splitting the maximum coding unit three times. As a depth deepens, since an image is encoded based on a smaller coding unit, an image including a more detailed scene may be encoded.

Figure 4:
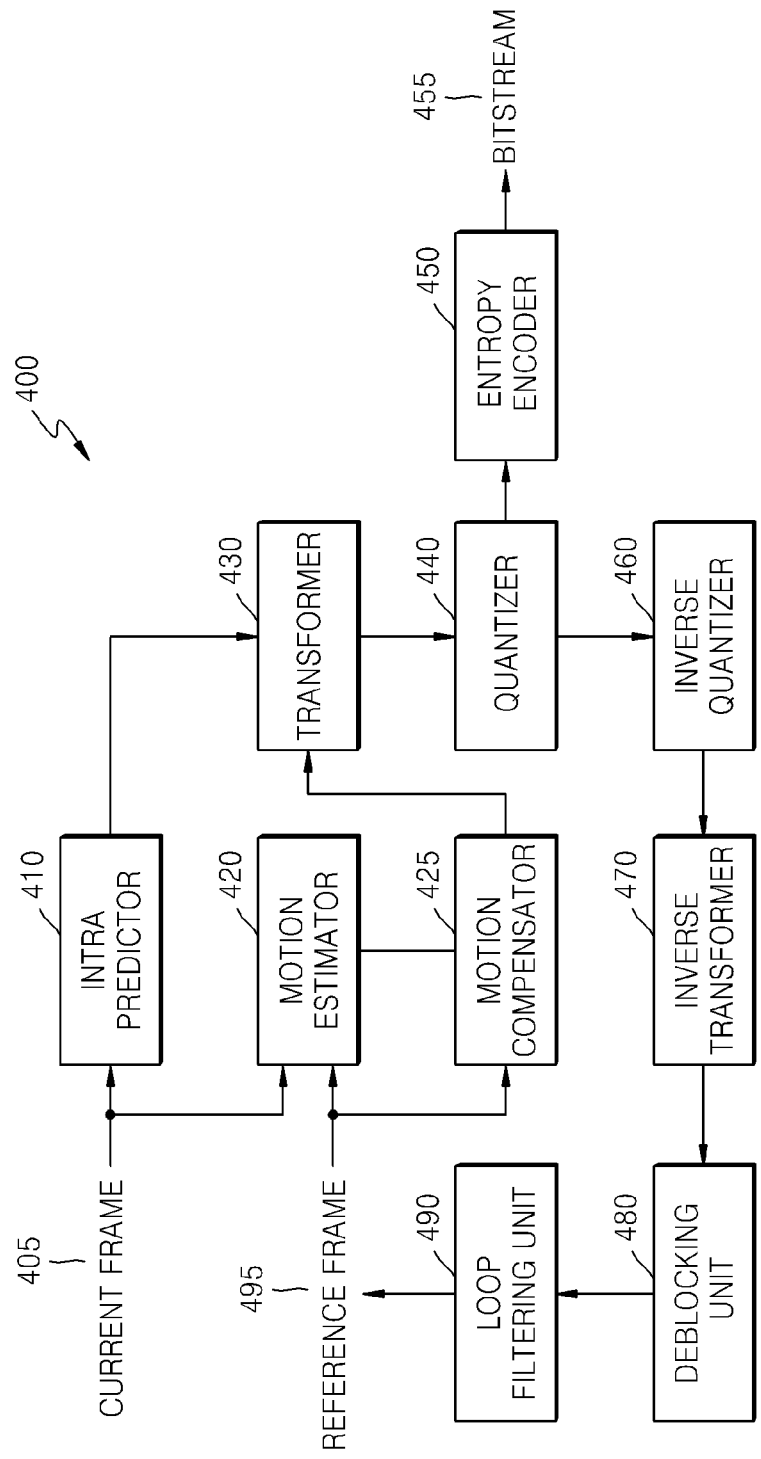
FIG. 4 is a block diagram illustrating an image encoder based on a coding unit, according to an exemplary embodiment.

FIG. 4 is a block diagram illustrating an image encoder 400 based on a coding unit, according to an exemplary embodiment.

The image encoder 400 performs operations in order for the coded depth determiner 120 of the apparatus 100 of FIG. 1 to encode image data.

Referring to FIG. 4, an intra predictor 410 performs intra prediction on a prediction unit in an intra mode from among a current frame 405, and a motion estimator 420 and a motion compensator 425 respectively perform inter prediction and motion compensation by using the current frame 405 and a reference frame 495 on a prediction unit in an inter mode.

Residual values are generated based on prediction units output from the intra predictor 410, the motion estimator 420, and the motion compensator 425, and the residual values are output as a quantized transformation coefficient through a transformer 430 and a quantizer 440.

The quantized transformation coefficient is restored as residual values through an inverse quantizer 460 and an inverse transformer 470, and the residual values are post-processed through a deblocking unit 480 and a loop filter 490 and output to the reference frame 495. The quantized transformation coefficient may be output as a bitstream 455 through an entropy encoder 450.

In order to encode according to a method of encoding an image according to an exemplary embodiment, the intra predictor 410, the motion estimator 420, the motion compensator 425, the transformer 430, the quantizer 440, the entropy encoder 450, the inverse quantizer 460, the inverse transformer 470, the deblocking unit 480, and the loop filter 490 of the image encoder 400 may perform image encoding processes based on each maximum coding unit from among coding units in a tree structure by considering a maximum depth for every maximum coding unit. In particular, the intra predictor 410, the motion estimator 420, and the motion compensator 425 may determine a partition and a prediction mode in each coding unit from among the coding units in the tree structure by considering a maximum size and a maximum depth of a current maximum coding unit, and the transformer 430 may determine a size of a transformation unit by considering a size of a transmission unit in each coding unit from among the coding units in the tree structure.

Figure 5:
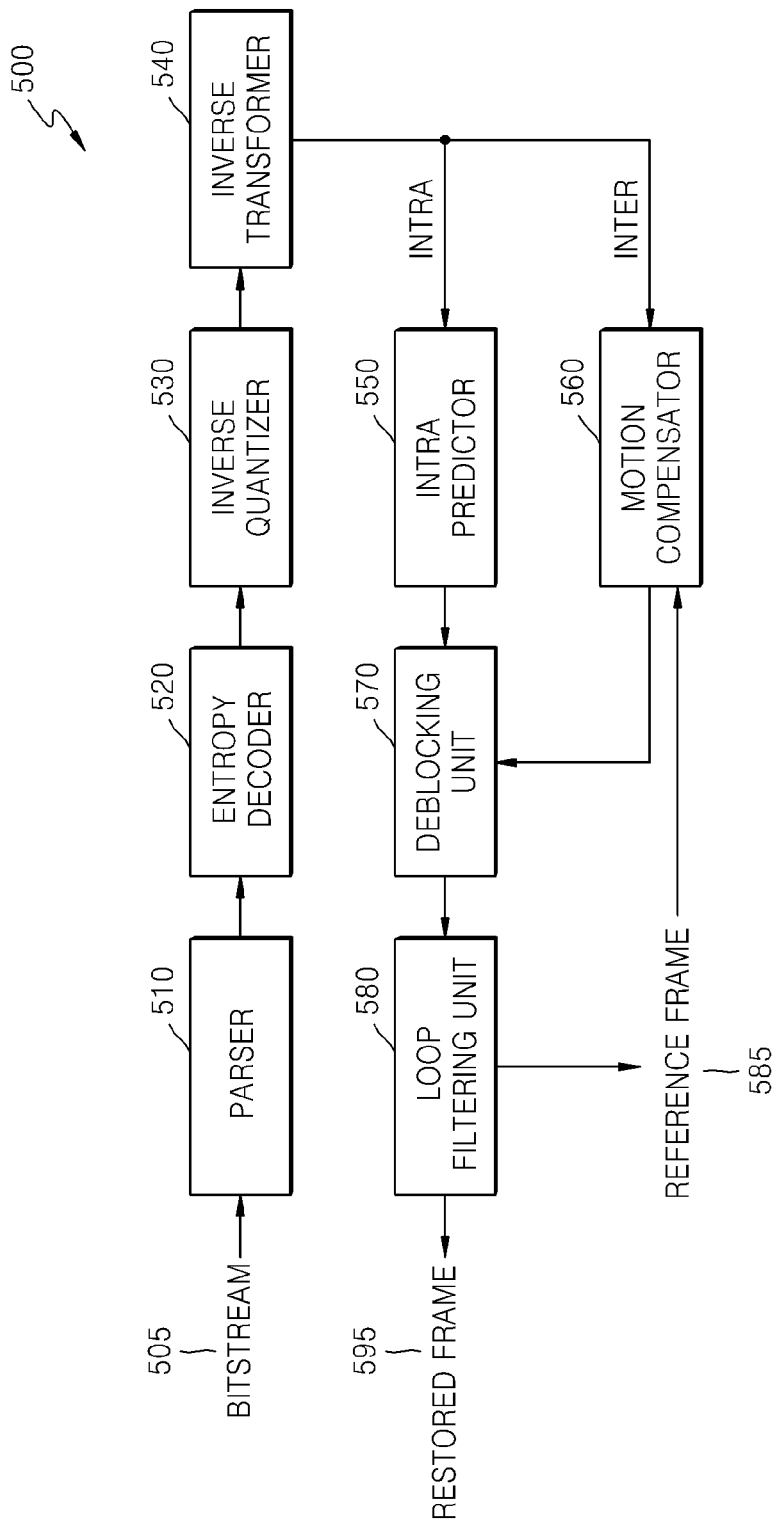
FIG. 5 is a block diagram illustrating an image decoder based on a coding unit, according to an exemplary embodiment.

FIG. 5 is a block diagram illustrating an image decoder based on a coding unit, according to an exemplary embodiment.

Referring to FIG. 5, a bitstream 505 passes through a parser 510 to parse encoding information used for decoding encoded image data which is to be decoded. The encoded image data is output as inversely quantized data through an entropy decoder 520 and an inverse quantizer 530, and is restored to residual values through an inverse transformer 540. The residual values are added to a result of intra prediction of an intra predictor 550 or a result of motion compensation of a motion compensator 560 to be restored for every coding unit. A restored coding unit passes through a deblocking unit 570 and a loop filter 580 to be used for prediction of a next picture or a next coding unit.

In order to perform decoding according to a method of decoding an image according to an exemplary embodiment, the parser 510, the entropy decoder 520, the inverse quantizer 530, the inverse transformer 540, the intra predictor 550, the motion compensator 560, the deblocking unit 570, and the loop filter 580 of the image decoder 500 may perform image decoding processes based on coding units in a tree structure according to maximum coding units. In particular, the intra predictor 550 and the motion compensator 560 may determine a partition and a prediction mode for each of the coding units in the tree structure, and the inverse transformer 540 may determine a size of a transformation unit for every coding unit.

Figure 6:
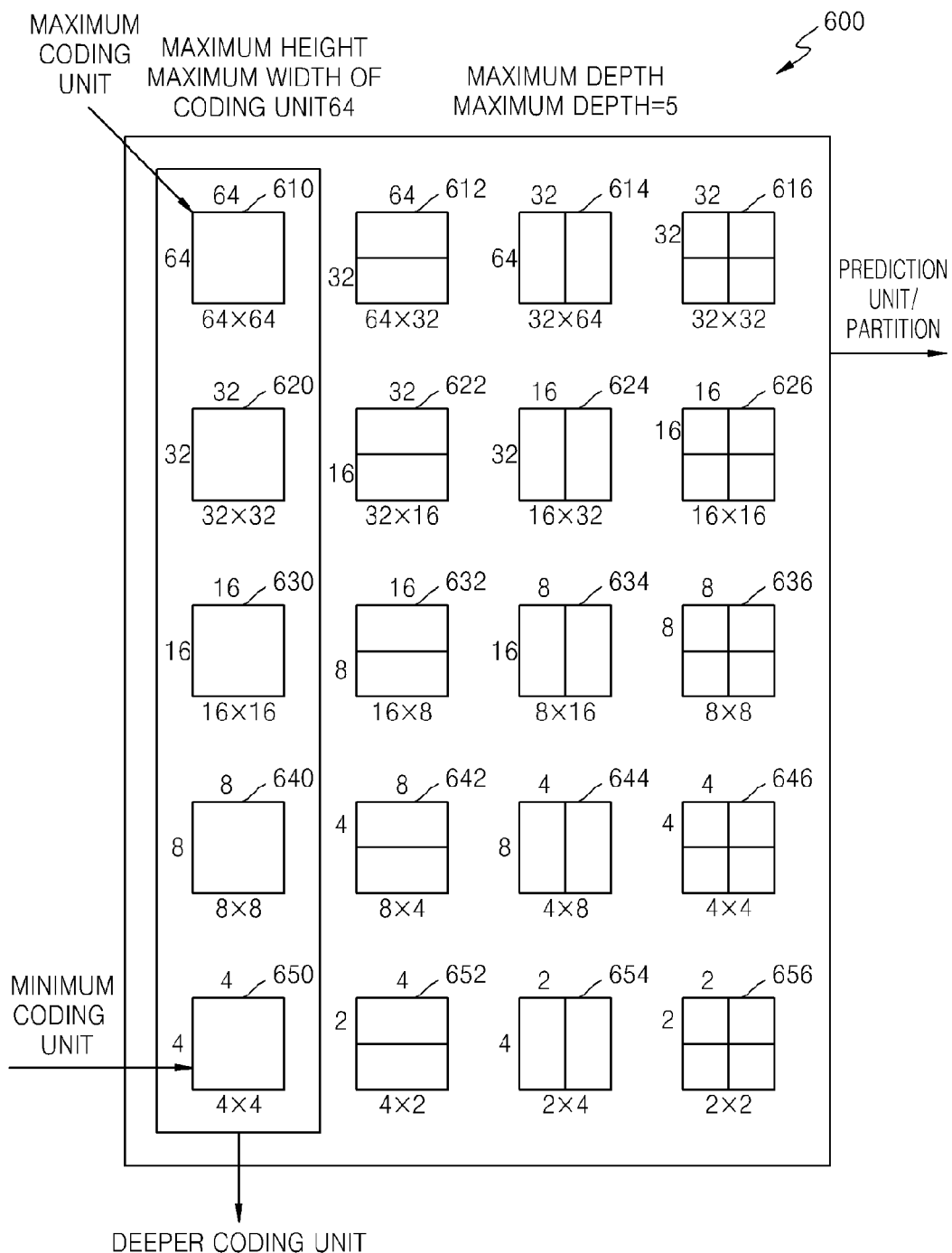
FIG. 6 is a diagram illustrating prediction units and coding units, according to depths, according to an exemplary embodiment.

FIG. 6 is a diagram illustrating prediction units and coding units according to the depths, according to an exemplary embodiment.

The apparatus 100 of FIG. 1 and the apparatus 200 of FIG. 2 use hierarchical coding units in order to consider, characteristics of an image. A maximum height, a maximum width, and a maximum depth of a coding unit may be determined adaptively according to characteristics of an image, or may be variously set according to requests of a user. According to a maximum size of a preset coding unit, sizes of coding units according to depths may be determined.

In a hierarchical structure 600 of coding units, a maximum height and a maximum width of coding units are 64 and a maximum depth of the coding units is 4. Since a depth deepens along a vertical axis of the hierarchical structure 600 of the coding units, a height and a width of the coding unit are split according to depths. Also, along a horizontal axis of the hierarchical structure 600 of the coding units, a prediction unit and a partition, which are basis units for prediction of the coding units according to depths, are illustrated.

A coding unit 610 is a maximum coding unit in the hierarchical structure 600 of the coding units and has a depth of 0 and a size, that is expressed as height×width, of 64×64. A depth deepens along the vertical axis, and a coding unit 620 having a size of 32×32 and a depth of 1, a coding unit 630 having a size of 16×16 and a depth of 2, a coding unit 640 having a size of 8×8 and a depth of 8, and a coding unit 650 having a size of 4×4 and a depth of 4 exist. The coding unit 650 having the size of 4×4 and the depth of 4 is a minimum coding unit.

Also, referring to FIG. 6, along the horizontal axis according to depths, prediction units and partitions of a coding unit are illustrated. That is, if the maximum coding unit 610 having the depth of 0 and the size of 64×64 is a prediction unit, the prediction unit may be split into a partition 610 having the size of 64×64 included in the coding unit 610 having the size of 64×64, partitions 612 having a size of 64×32, partitions 614 having a size of 32×64, and partitions 616 having a size of 32×32.

Likewise, a prediction unit of the coding unit 620 having the depth of 1 and the size of 32×32 may be split into a partition 620 having the size of 32×32 included in the coding unit 620 having the size of 32×32, partitions 622 having a size of 32×16, partitions 624 having a size of 16×32, and partitions 626 having a size of 16×16.

A prediction unit of the coding unit 630 having the depth of 2 and the size of 16×16 may be split into a partition 630 having the size of 16×16 included in the coding unit 630 having the size of 16×16, partitions 630 having a size of 16×16, partitions 632 having a size of 16×8, partitions 634 having a size of 8×16, and partitions 636 having a size of 8×8.

A prediction unit of the coding unit 640 having the depth of 3 and the size of 8×8 may be split into a partition 640 having the size of 8×8 included in the coding unit 640 having the size of 8×8, partitions 642 having a size of 8×4, partitions 644 having a size of 4×8, and partitions 646 having a size of 4×4.

Finally, the coding unit 650 having the depth of 4 and the size of 4×4 is a minimum coding unit and has a coding unit of a lower most depth, and a prediction unit of the coding unit 650 is set to a partition 650 having the size of 4×4.

In order to determine a coded depth of the maximum coding unit 610, the coded depth determiner 120 of the apparatus 100 performs encoding on coding units of depths included in the maximum coding unit 610.

As a depth deepens, the number of coding units according to depths for including data of the same range and size increases. For example, 4 coding units having a depth of 2 are needed to cover data included in one coding unit having a depth of 1. Accordingly, in order to compare encoding results of the same data according to depths, one coding unit having a depth of 1 and four coding units having a depth of 2 are each encoded.

In order to perform encoding according to depths, along a horizontal axis of the hierarchical structure 600 of the coding units, encoding may be performed for every prediction unit of coding units according to depths and a representative encoding error which is a least encoding error in a corresponding depth may be selected. Also, a depth deepens along a vertical axis of the hierarchical structure 600 of the coding units, encoding may be performed for every depth, representative encoding errors according to depths may be compared, and a minimum encoding error may be searched for. A depth at which a minimum encoding error occurs in the maximum coding unit 610 may be selected as a coded depth and a partition type of the maximum coding unit 610.

FIG. 7 is a diagram illustrating a relationship between a coding unit and a transformation unit, according to an exemplary embodiment.

The apparatus 100 of FIG. 1 and the apparatus 200 of FIG. 2 perform encoding or decoding by splitting an image in coding units having a size equal to or smaller than that of a maximum coding unit for every maximum coding unit. A size of a transformation unit for frequency transformation during encoding may be selected based on a data unit not larger than each coding unit. For example, if a current coding unit 710 has a size of 64×64, frequency transformation may be performed by using a transformation unit 720 having a size of 32×32. Also, data of the coding unit 710 having the size of 64×64 may be encoded by performing frequency transformation in transformation units having sizes of 32×32, 16×16, 8×8, and 4×4, and a transformation unit having a least error may be selected.

FIG. 8 is a diagram illustrating encoding information according to depths, according to an exemplary embodiment.

The image data encoding unit 130 of the apparatus 100 may encode and transmit information 800 about a partition type, information 810 about a prediction mode, and information 820 about a size of a transformation unit for every coding unit of each coded depth as information about an encoding mode.

The information 800 which is information for prediction encoding of a current coding unit is information about a shape obtained by splitting the current coding unit. For example, a current coding unit CU_0 having a size of 2N×2N may be split into a partition 802 having a size of 2N×2N, a partition 804 having a size of 2N×N, a partition 806 having a size of N×2N, and a partition 808 having a size of N×N and any one of the partitions 802 through 808 may be used. In this case, the information 800 is set to indicate one of the partition 802 having the size of 2N×2N, the partition 804 having the size of 2N×N, the partition 806 having the size of N×2N, and the partition 808 having the size of N×N.

The information 810 indicates a prediction mode of each partition. For example, the information 810 indicates a mode of prediction encoding performed on a partition indicated by the information 800, i.e., any one of an intra mode 812, an inter mode 814, and a skip mode 816.

Also, the information 820 indicates a transformation unit to be based on which frequency transformation is performed on a current coding unit. For example, the transformation unit may be any one of a first intra transformation unit size 822, a second intra transformation unit size 824, a first inter transformation unit size 826, and a second intra transformation unit size 828.

The encoding information extractor 210 of the apparatus 200 may extract the information 800, the information 810, and the information 820 for every coding unit of each depth and use the information 800, 810, and 820 to decode an image.

Figure 9:
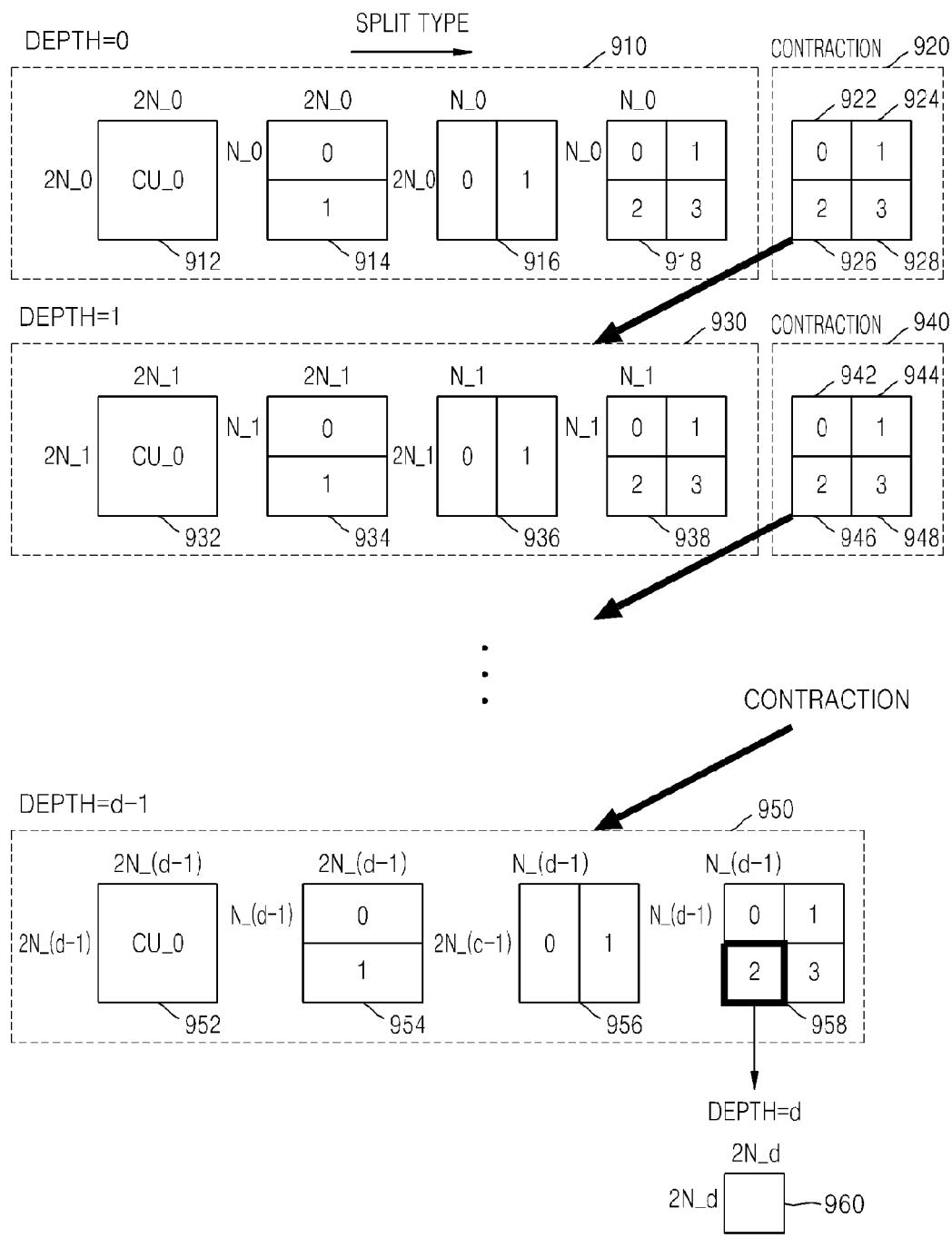
FIG. 9 is a diagram illustrating coding units according to depths, according to an exemplary embodiment.

FIG. 9 is a diagram illustrating coding units according to depths, according to an exemplary embodiment.

Split information may be used in order to indicate a change in a depth. The split information indicates whether a coding unit of a current depth is split into coding units of a lower depth.

A prediction unit 910 for prediction encoding of a coding unit having a depth of 0 and a size of 2N_0×2N_0 may include a partition type 912 having a size of 2N_0×2N_0, a partition type 914 having a size of 2N_0×N_0, a partition type 916 having a size of N_0×2N_0, and a partition type 918 having a size of N_0×N_0. Although only the partition types 912, 914, 916, and 918 whose prediction units are symmetrically split are illustrated in FIG. 9, the present exemplary embodiment is not limited thereto and asymmetrical partitions, partitions having arbitrary shapes, and geometrical partitions may be included.

For each partition type, prediction encoding is to be repeatedly performed for one prediction unit having the size of 2N_0×2N_0, two prediction units having the size of 2N_0×N_0, two prediction units having the size of N_0×2N_0, and four prediction units having the size of N_0×N_0. For the prediction units having the sizes of 2N_0×2N_0, N_0×2N_0, 2N_0×N_0, and N_0×N_0, prediction encoding may be performed in an intra mode and an inter mode. Prediction encoding in a skip mode may be performed only for the prediction unit having the size of 2N_0×2N_0. If an encoding error of any one of the partition types 912, 914, and 916 having the sizes of 2N_0×2N_0, 2N_0×N_0, and N_0×2N_0 is the smallest, more splitting is not necessary.

If the encoding error is the smallest in the partition type 918 having the size N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for performing prediction encoding on a coding unit 930 having a depth of 1 and a size of 2N_1×2N_1 (=N_0×N_0) may include a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960 which have a depth of 2 and a size of N_2×N_2 to search for a minimum encoding error.

When a maximum depth is d, a split operation according to depths may be performed until a depth becomes d−1, and split information may be encoded until a depth becomes d−2. In other words, when encoding is performed until the depth is d−1 after a coding unit having a depth of d−2 is split in operation 970, a prediction unit 990 for performing prediction encoding on a coding unit 980 having a depth of d−1 and a size of 2N_(d−1)×2N_(d−1) may include a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) to search for a partition type having a minimum encoding error. Even when the partition type 998 has the minimum encoding error, since the maximum depth is d, a coding unit CU_(d−1) having a depth of d−1 is no longer split to a lower depth, and a coded depth for the coding units of a current maximum coding unit 900 is determined to be d−1 and a partition type of the current maximum coding unit 900 may be determined to be N_(d−1)×N_(d−1). Also, since the maximum depth is d, split information for the minimum coding unit 980 is not set.

A data unit 999 may be a 'minimum unit' for the current maximum coding unit. A minimum unit may be a rectangular data unit obtained by splitting a minimum coding unit by 4. By performing the encoding repeatedly, the apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The encoding information extractor 220 of the apparatus 200 may extract and use the information about the coded depth and the prediction unit of the coding unit 900 to decode the coding unit 900. The apparatus 200 may determine a depth, in which split information is 0, as a coded depth by using split information according to depths, and use information about an encoding mode of the corresponding depth to decode an image.

Figure 10:
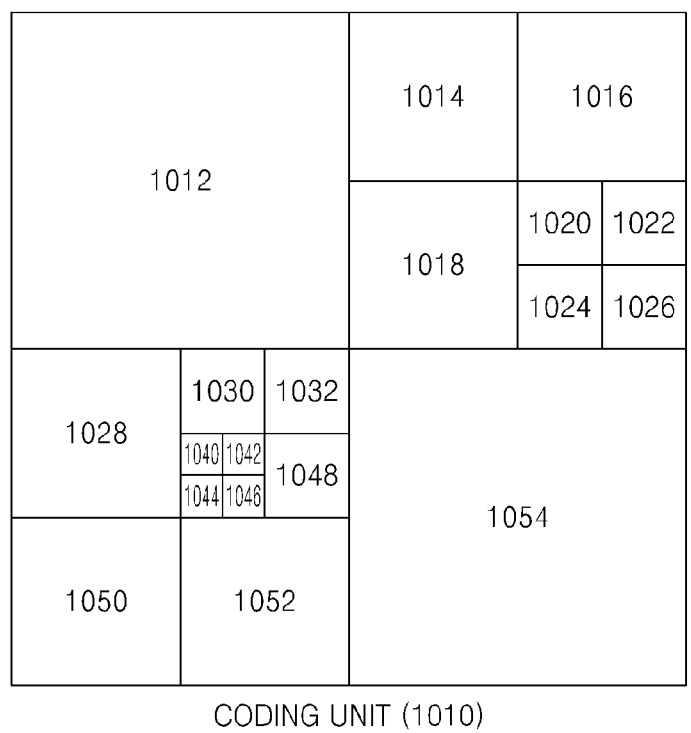
FIGS. 10 through 12 are diagrams illustrating a relationship between coding units, prediction units, and transformation units, according to an exemplary embodiment.
Figure 11:
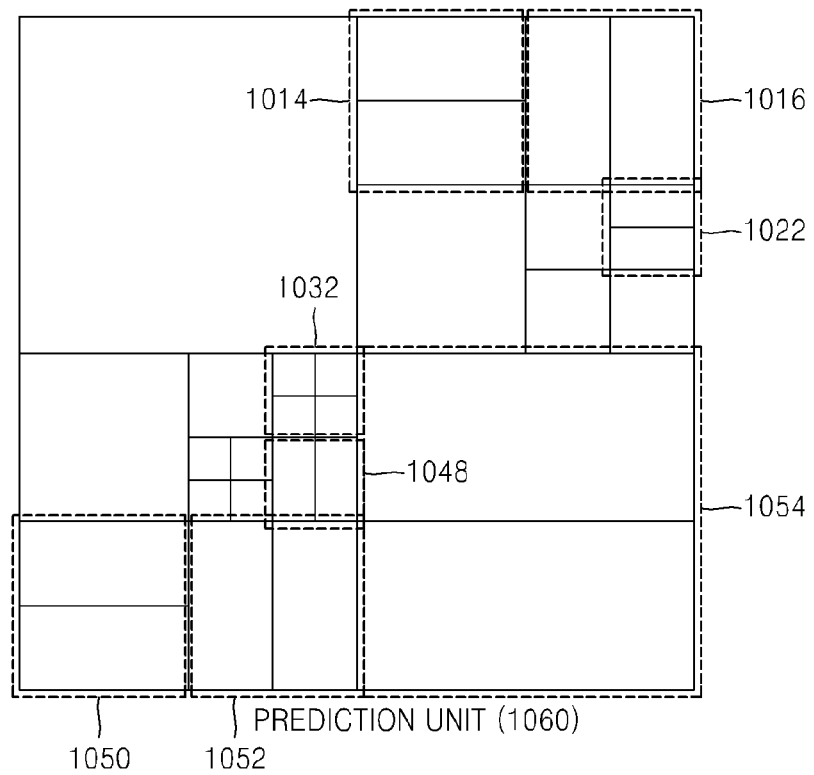
Figure 12:
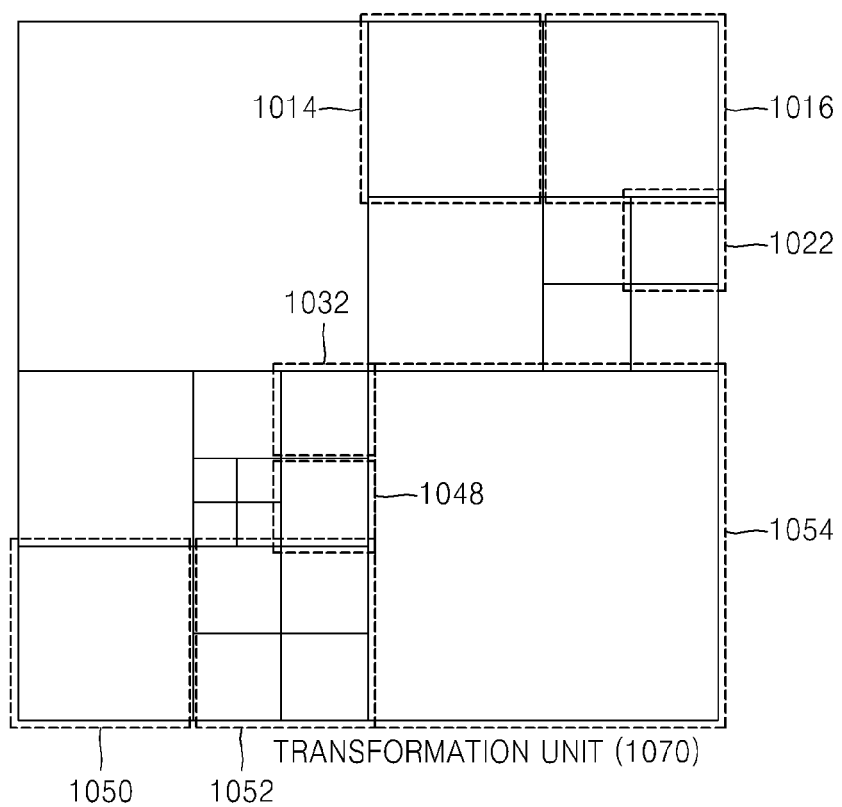

FIGS. 10 through 12 are diagrams illustrating a relationship between coding units 1010, prediction units 1060, and transformation units 1070, according to an exemplary embodiment.

The coding units 1010 are coding units according to coded depths determined by the apparatus 100 in a maximum coding unit 1000. The prediction units 1060 are partitions of prediction units of each of the coding units 1010, and the transformation units 1070 are transformation units of each of the coding units 1010.

When a depth of the maximum coding unit 1000 is 0, depths of coding units 1012 and 1054 are 1, depths of coding units 1014, 1016, 1018, 1028, 1050, and 1052 are 2, depths of coding units 1020, 1022, 1024, 1026, 1030, 1032, and 1038 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units in the coding units 1010. In other words, the partitions 1014, 1022, 1050, and 1054 have a size of 2N×N, the partitions 1016, 1048, and 1052 have a size of N×2N, and the partition 1032 has a size of N×N. Prediction units and partitions of the coding units 1010 are smaller than or equal to their corresponding coding units.

Frequency transformation or frequency inverse transformation is performed on image data of some transformation units 1052 and 1054 in the transformation units 1070 in a data unit that is smaller than the coding units 1052 and 1054. Also, the transformation units 1014, 1016, 1022, 1032, 1048, 1050, 1052, and 1054 in the transformation units 1070 are different from those in the prediction units 1060 in terms of sizes and shapes. In other words, the apparatuses 100 and 200 may perform a prediction, frequency transformation, and frequency inverse transformation individually on a data unit in the same coding unit. Accordingly, encoding is recursively performed on each of coding units to determine an optimum coding unit, and thus coding units having a recursive tree structure may be obtained.

Encoding information may include split information about a coding unit, information about a partition type, information about a prediction mode, and information about a size of a transformation unit. Table 1 shows the encoding information that may be set by the apparatus 100 of FIG. 1 and the apparatus 200 of FIG. 2.

TABLE 1

| | Split Information 0 (Encoding of Coding Unit having Size of 2N × 2N and Current Depth of d) | | | | |
|---|---|---|---|---|---|
| | Partition Type | | Size of Transformation Unit | | |
| Prediction Mode | Symmetrical Partition Type | Asymmetrical Partition Type | Split Information 0 of Transformation Unit | Split Information 1 of Transformation Unit | Split Information 1 |
| Intra Inter Skip | 2N × 2N 2N × N N × 2N | 2N × nU 2N × nD nL × 2N | 2N × 2N | N × N (Symmetrical Type) | Repeatedly Encode Coding |

TABLE 1-continued

Split Information 0
(Encoding of Coding Unit having Size of 2N × 2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| (Only 2N × 2N) | N × N | nR × 2N | | N/2 × N/2 (Asymmetrical Type) | Units having Lower Depth of d + 1 |

The image data encoding unit 130 of the apparatus 100 may output encoding information about coding units having a tree structure, and the encoding information extractor 220 of the apparatus 200 may extract the encoding information about the coding units having the tree structure from a received bitstream.

Split information indicates whether a current coding unit is split into coding units of a lower depth. If split information of a current depth d is 0, a depth at which a current coding unit is no longer split into a lower depth is a coded depth, information about a partition type, prediction mode, and a size of a transformation unit may be defined for the coded depth. If the current coding unit is to be further split according to the split information, encoding is to be independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in a ratio of 1:3 and 3:1, and the asymmetrical partition types having the sizes of nL×2N and nR×2N may be respectively obtained by splitting the width of the prediction unit in a ratio of 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, the size of the transformation unit may be N×N, and if the partition type of the current coding unit is an asymmetrical partition type, the size of the transformation unit may be N/2×N/2.

Encoding information about coding units having a tree structure may be assigned to at least one of a coding unit having a coded depth, a prediction unit, and a minimum unit.

The coding unit having the coded depth may include at least one of a prediction unit and a minimum unit containing the same encoding information.

Accordingly, it is determined whether adjacent data units are included in the same coding unit having the coded depth by comparing encoding information of the adjacent data units. Also, a corresponding coding unit having a coded depth is determined by using encoding information of a data unit, and thus a distribution of coded depths in a maximum coding unit may be determined.

Accordingly, if a current coding unit is predicted based on encoding information of adjacent data units, encoding information of data units in coding units adjacent to the current coding unit may be directly referred to and used.

Alternatively, if a current coding unit is predicted based on encoding information of adjacent data units, data units adjacent to the current coding unit are searched using encoding information of the data units, and the searched adjacent coding units may be referred to for predicting the current coding unit.

Figure 13:
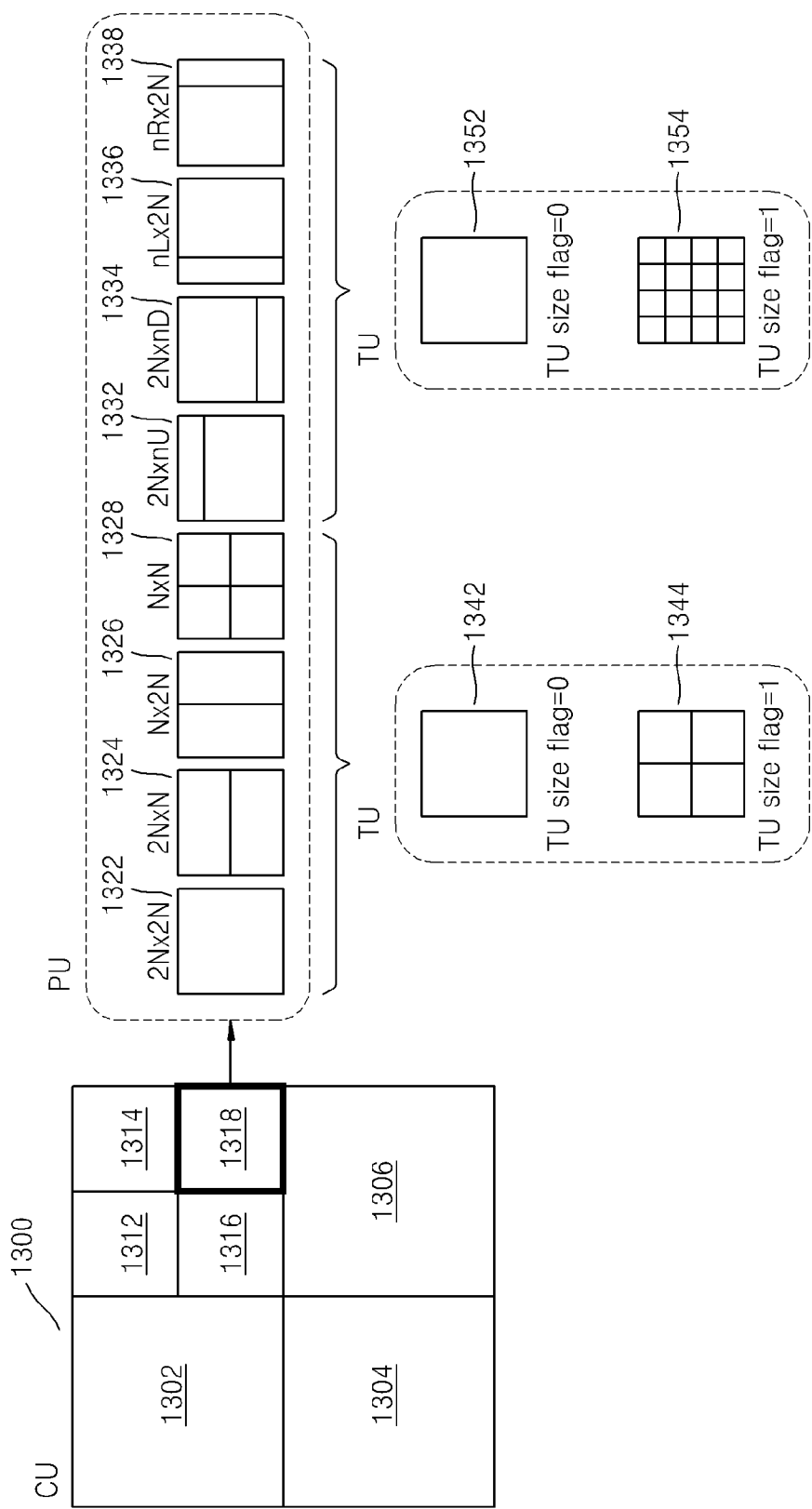
FIG. 13 is a diagram illustrating a relationship between a coding unit, a prediction unit, and a transformation unit according to encoding mode information of Table 1.

FIG. 13 is a diagram illustrating a relationship between a coding unit, a prediction unit, and a transformation unit according to encoding mode information of Table 1.

A maximum coding unit 1300 includes coding units 1302, 1304, 1306, 1312, 1314, 1316, and 1318 of coded depths. Since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

A process of predicting a transformation coefficient in a frequency domain which is performed by the frequency transformer 430 of the apparatus 400 of FIG. 4 and the frequency inverse transformer 540 of the apparatus 500 of FIG. 5 will be explained in detail below.

Figure 14:
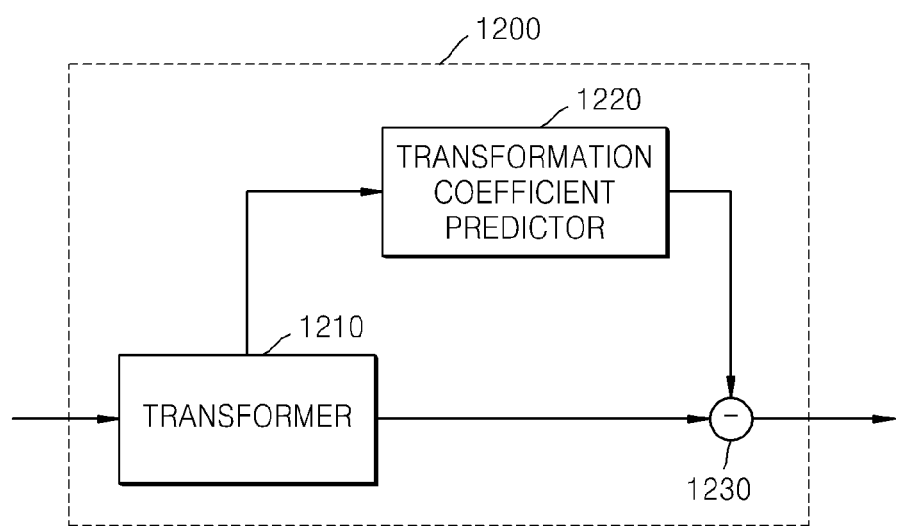
FIG. 14 is a block diagram illustrating an apparatus for performing frequency transformation according to an exemplary embodiment.

FIG. 14 is a block diagram illustrating an apparatus 1200 for transforming a frequency, according to an exemplary embodiment. The apparatus 1200 of FIG. 14 may be used as the frequency transformer 430 of the apparatus 400 of FIG. 4.

Referring to FIG. 14, the apparatus 1200 includes a transformer 1210, a transformation coefficient predictor 1220, and a subtractor 1230.

The transformer 1210 generates a transformation block by transforming a first residual block which is a difference between a current block to be encoded and a prediction block into a frequency domain. The prediction block is generated through intra prediction performed by the intra predictor 410 of FIG. 4 or motion compensation performed by the motion compensator 425 of FIG. 4. The first residual block which indicates an original residual block which is a difference between the current block and the prediction block is distinguished from a second residual block which indicates an incomplete residual block that will be explained below. The transformer 1210 generates the transformation block by performing discrete cosine transformation on the first residual block.

The transformation coefficient predictor 1220 generates the second residual block by replacing at least one transformation coefficient to be predicted from among transformation coefficients of the transformation block with a predetermined value and inversely transforming the transformation block including the transformation coefficient replaced with the predetermined value. The transformation coefficient predictor 1220 generates a predictor of the transformation coefficient to be predicted by using values of the second residual block. A process of generating a predictor of the transformation coefficient will be explained below in detail.

The subtractor 1230 calculates a difference between the transformation coefficient and the predictor. The apparatus 1200 outputs only a difference between the transformation coefficient predicted by the transformation coefficient predictor 1220 and the predictor of the transformation coefficient and outputs remaining transformation coefficients of an original transformation block other than the transformation coefficient predicted by the transformation coefficient predictor 1220. Since only the difference between the predictor and the transformation coefficient to be predicted from among the transformation coefficients is encoded by the apparatus 1200, the amount of encoded data may be reduced. In particular, when the process of predicting the transformation coefficient is applied to transformation coefficients having a low frequency component and having a relatively large value, image compression efficiency may be further improved.

A process of generating predictor values of transformation coefficients will be explained in detail below.

Figure 15:
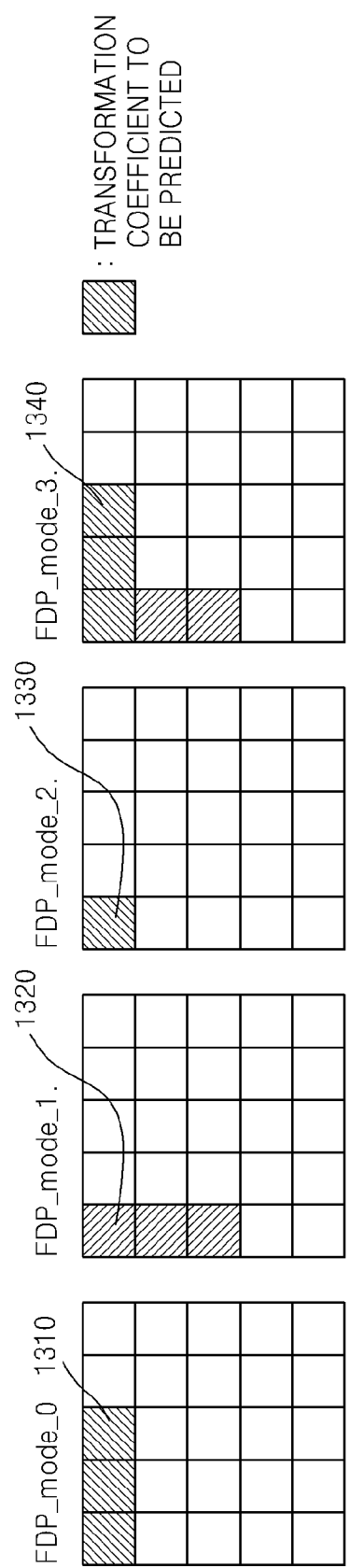
FIG. 15 is a diagram illustrating transformation coefficient prediction modes, according to an exemplary embodiment.

FIG. 15 is a diagram illustrating transformation coefficient prediction modes according to an exemplary embodiment.

Referring to FIG. 15, the transformation coefficient prediction modes FDP_mode_n (where n is 0, 1, 2, and 3) are classified as follows according to a transformation coefficient to be predicted. Transformation coefficients of a first region to be predicted by a predictor from among transformation coefficients of a first residual block which is a difference between a current block and a prediction block are encoded by using a difference between the predictor and an original transformation coefficient, and transformation coefficients of a second region other than the first region are encoded by using the original transformation coefficient without a process of predicting a transformation coefficient.

1) FDP_mode_0 is a mode in which a predetermined number of, for example, L, transformation coefficients 1310 of an uppermost row of a transformation block are predicted.

2) FDP_mode_1 is a mode in which a predetermined number of, for example, L, transformation coefficients 1320 of a leftmost column of the transformation block are predicted.

3) FDP_mode_2 is a mode in which a direct current (DC) coefficient 1330 of the transformation block is predicted.

4) FDP_mode_3 is a mode in which the DC coefficient and a predetermined number of, for example, L, transformation coefficients 1340 of the uppermost row and the leftmost column of the transformation block are predicted.

A transformation coefficient prediction mode may be determined according to a prediction mode of a prediction block of a current block. For example, when the prediction block is generated in a vertical intra prediction mode, the mode FDP_mode_0 may be selected. When the prediction block is generated in a horizontal intra prediction mode, the mode FDP_mode_1 may be selected. When the prediction block is generated through intra prediction in a DC mode, the mode FDP_mode_2 may be selected. When the prediction block is generated in a prediction mode with a direction different from that of the aforesaid intra prediction mode (or in a mode including motion compensation), the mode FDP_mode_3 may be selected. The reason why a transformation coefficient prediction mode is selected according to a prediction mode is that according to a directivity of a prediction mode, a residual value at a boundary of a residual block close to a reference pixel decreases because a close neighboring pixel is used as a reference pixel whereas a residual value far away from the reference pixel increases. That is, according to an exemplary embodiment, transformation coefficients are predicted such that smoothness between pixels of a current block and a neighboring pixel that is encoded and restored before being used to predict the current block is optimized.

The number L of transformation coefficients to be predicted may be set according to a size of a transformation block as shown in Table 2.

TABLE 2

| Size of transformation block | Transformation coefficient prediction length L |
| --- | --- |
| 4 × 4 | 3 |
| 8 × 8 | 3 |
| 16 × 16 | 4 |
| 32 × 32 | 4 |
| 64 × 64 | 4 |

A transformation coefficient prediction length L indicating the number of transformation coefficients to be predicted of any one row or column of a transformation block may be changed without being limited to Table 2.

FIG. 16 is a reference diagram for explaining nomenclatures of parameters used to predict a transformation coefficient, according to an exemplary embodiment.

When a size of a current block is N×M (where N and M are integers), each of a prediction block, a transformation block, a first residual block, and a second residual block has a size of N×M. FIG. 16 illustrates a case where N×M is 5×5. A residual value located at (x,y) (where $0 \leq x \leq N-1$, $0 \leq y \leq M-1$) of a first residual block 1410 is defined as res(x,y), and a transformation coefficient located at (x,y) of a transformation block 1420 generated by performing discrete cosine transformation on the first residual block 1410 is defined as c(x,y). Also, a residual value located at (x,y) of a second residual block 1430 is defined as f(x,y). A predictor 1440 of the transformation coefficient c(x,y) is defined as $fdp_{xy}$. In particular, in FIG. 16, predictor values of all transformation coefficients are not generated and only a predetermined number of predictor values from among predictors 1445 of an uppermost row and a leftmost column are generated. This is because since the transformation coefficients of the uppermost row and the leftmost column have larger values than other transformation coefficients and remaining transformation coefficients closer to a high frequency component have values closer to 0, compression efficiency is not much higher than the amount of calculation used for prediction if such transformation coefficients of a high frequency component are predicted.

A process of predicting a transformation coefficient according to a transformation coefficient prediction mode will be explained in detail below.

1. Process of Predicting Transformation Coefficient in Transformation Coefficient Prediction Mode 0 (FDP_mode_0)

When a basic component function $basis\_element_{nm}$ of discrete cosine transformation is $basis\_element_{nm} = \cos(n_x x)\cos(m_y y)$ and a transformation coefficient at (n,m) is $coeff_{nm}$, a residual value res(x,y) of a residual block may be expressed by linearly combining the basic component function $basis\_element_{nm}$ and the transformation coefficient $coeff_{nm}$ as shown in Equation 1.

$$res(x, y) = \sum_{n=0}^{N-1} \sum_{m=0}^{M-1} coeff_{nm} basis\_element_{nm}(x, y). \qquad (1)$$

When n=m=0, the basic component function $basis\_element_{00}$ of a component "0" has a constant 1. $coeff_{00}$ is generally referred to as a DC coefficient and indicates an average of input values subjected to discrete cosine transformation.

Transformation coefficients other than the DC coefficient are referred to as alternating current (AC) coefficients.

A DC coefficient and an AC coefficient in Equation 1 are separately expressed as shown in Equation 2.

$$res(x, y) = coeff_{00} + \sum_{n+m>0} \sum coeff_{nm} basis\_element_{nm}(x, y). \qquad (2)$$

In Equation 2, n+m>0 indicates that an AC coefficient is calculated. If values of transformation coefficients of an uppermost row to be predicted of a transformation block including the DC coefficient $coeff_{00}$ in Equation 2 are set to 0 and inverse discrete cosine transformation is performed, a restored residual value is different from an actual residual value. This is because the values of the transformation coefficients of the uppermost row to be predicted are set to 0. A residual block generated by replacing some values of transformation coefficients with a value and inversely transforming a transformation block including the replaced transformation coefficients is referred to as an incomplete residual block or a second residual block. A residual value f(x,y) of a second residual block which is an incomplete residual block may be expressed as shown in Equation 3.

$$f(x, y) = 0 + \sum_{n+m>0} \sum coeff_{nm} basis\_element_{nm}(x, y). \qquad (3)$$

As described above, there is a difference between a residual value f(x,y) of an incomplete residual block and a residual value res(x,y) of an actual residual block due to transformation coefficients set to 0. In general, a DC coefficient has a largest value from among transformation coefficients. Accordingly, a difference between the residual value f(x,y) of the incomplete residual block and the residual value res(x,y) of the actual residual block is mostly due to a difference between DC coefficients. Accordingly, a value of a DC coefficient may be predicted as shown in Equation 4 from the residual values res(x,y) and f(x,y).

$$DC \equiv coeff_{00} = \frac{1}{NM} \sum_{x=0}^{N-1} \sum_{y=0}^{M-1} (res(x, y) - f(x, y)). \qquad (4)$$

A decoder may not directly predict a DC coefficient by using Equation 4. This is because a transformation coefficient of a frequency domain is transformed into a residual value of a time domain through inverse transformation during decoding, only a difference between a transformation coefficient predicted in a transformation coefficient prediction mode and a predictor may be included in a bitstream, and thus a residual value res(x,y) may not be restored directly.

In Equation 4, when it is assumed that only information of an uppermost row from among information about a residual value res(x,y) of an original residual block and information about a residual value f(x,y) of an incomplete residual block is used, a vertical intra prediction mode is used to generate a prediction mode, and res(x,0)=0 and res(0,y)≠0 due to a directivity of the original residual block, a predictor $fdp_{00}$ of a DC coefficient may be derived as shown in Equation 5.

$$fdp_{00} = \sigma_{00} = \sum_{x=0}^{N-1} f(x, 0). \qquad (5)$$

$fdp_{00}(\sigma_{00})$ is proportional to a value of the DC coefficient and has a sign opposite to that of the DC coefficient. Accordingly, $fdp_{00}$ in Equation 5 may be used as a predictor of the DC coefficient from among transformation coefficients of a transformation block of a residual block that is predicted and generated in a vertical intra prediction mode. In detail, a value obtained by multiplying $fdp_{00}$ by a predetermined correction value corr_factor may be used as a predictor value. The correction value corr_factor will be explained below.

A predictor $fdp_{n0}$ of a transformation coefficient c(n,0) of an uppermost row from among the transformation coefficients of the transformation block may be calculated by using a dot product of an incomplete residual block corresponding to the uppermost row and a basic component function as shown in Equation 6.

$$fdp_{n0} = \sum_{x=0}^{N-1} f(x, 0)^* basis\_element_{n0}(x, 0). \qquad (6)$$

Figure 17:
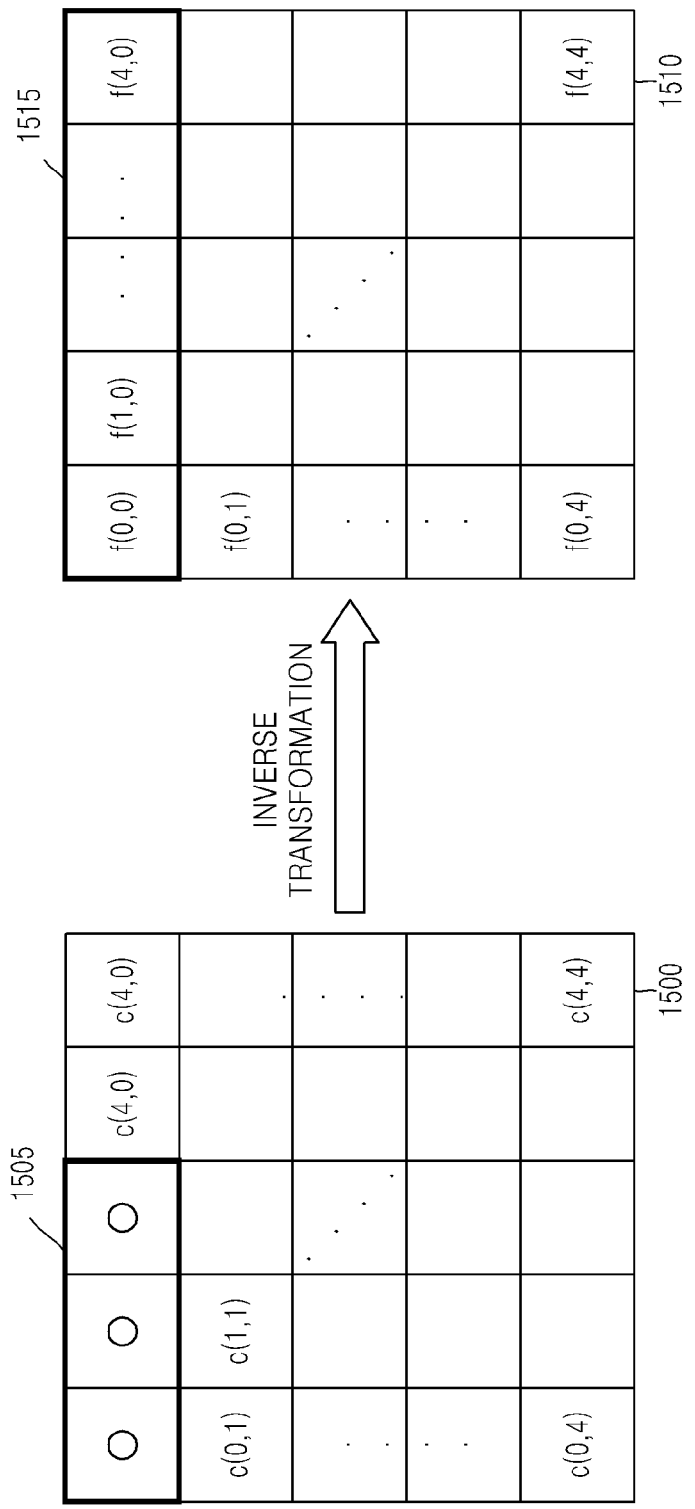
FIG. 17 is a reference diagram for explaining a process of predicting a transformation coefficient in a transformation coefficient prediction mode 0 FDP_mode_0 of FIG. 15.

FIG. 17 is a reference diagram for explaining a process of predicting a transformation coefficient in the transformation coefficient prediction mode 0 (FDP_mode_0) of FIG. 15.

In the transformation coefficient prediction mode 0 (FDP_mode_0), a predetermined number of transformation coefficients from among transformation coefficients of an uppermost row are predicted. As described above, the transformation coefficient prediction mode 0 (FDP_mode_0) may be selected when a prediction block is generated in a vertical intra prediction mode. FIG. 17 illustrates a process of generating predictor values of three transformation coefficients c(0,0), c(1,0), and c(2,0) from among transformation coefficients of an uppermost row.

The transformation coefficient predictor 1220 replaces the three transformation coefficients c(0,0), c(1,0), and c(2,0) to be predicted from among transformation coefficients of a transformation block with 0 as denoted by a reference numeral 1505 and generates a replaced transformation block 1500. The transformation coefficient predictor 1220 generates a second residual block 1510 by inversely transforming the replaced transformation block 1500.

The transformation coefficient predictor 1220 generates predictor values $fdp_{00}$, $fdp_{10}$, and $fdp_{20}$ of the three transformation coefficients c(0,0), c(1,0), and c(2,0) to be predicted by using values 1515 of an uppermost row of the second residual block 1510.

In detail, the transformation coefficient predictor 1220 generates the predictor $fdp_{00}$ of the DC coefficient c(0,0) by using Equation 5 as shown in $$fdp_{00} = \sum_{x=0}^{4} f(x, 0)$$

Also, the transformation coefficient predictor 1220 generates the predictor values $fdp_{10}$ and $fdp_{20}$ of the transformation coefficients c(1,0) and c(2,0) of the uppermost row by using Equation 6 as shown in $$fdp_{10} = \sum_{x=0}^{4} f(x, 0)*basis\_element_{10}(x, 0)$$

and $$fdp_{20} = \sum_{x=0}^{4} f(x, 0)*basis\_element_{20}(x, 0).$$

The transformation coefficient predictor 1220 outputs the predictor $fdp_{00}$ of the DC coefficient c(0,0) and the predictor values $fdp_{10}$ and $fdp_{20}$ of the transformation coefficients c(1, 0) and c(2,0) of the uppermost row, and the subtractor 1230 calculates and outputs a difference between an original transformation coefficient and a predictor value.

As described above, the transformation coefficient predictor 1220 may output scaling-corrected predictor values obtained by multiplying the predictor $fdp_{00}$ of the DC coefficient c(0,0) and the predictor values $fdp_{10}$ and $fdp_{20}$ of the transformation coefficients c(1,0) and c(2,0) of the uppermost row by a correction value corr_factor.

Figure 18:
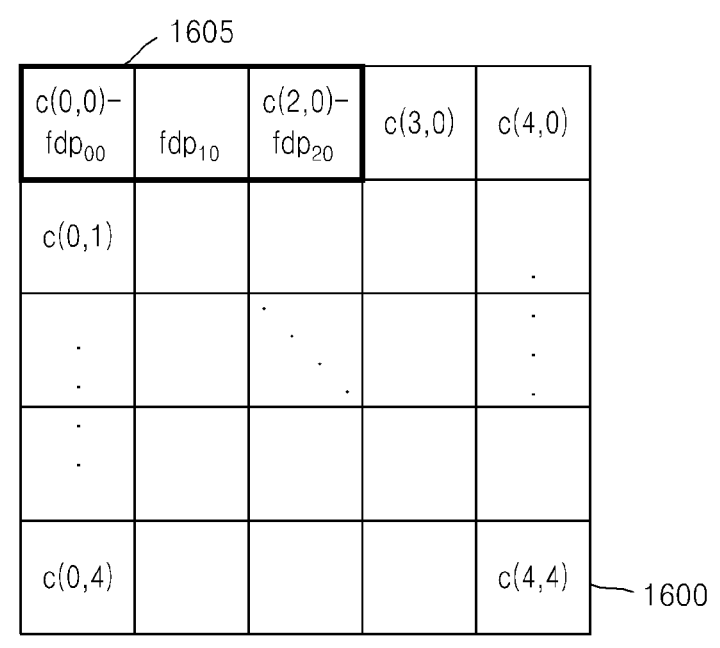

FIG. 18 is a diagram illustrating a transformation block encoded according to a prediction result of a transformation coefficient in the transformation coefficient prediction mode 0 FDP_mode_0.

Referring to FIG. 18, transformation coefficients 1605 to be predicted from among transformation coefficients of an uppermost row of a transformation block 1600 are not encoded and only a difference from a predictor calculated by the transformation coefficient predictor 1220 is encoded. Since the data amount of transformation coefficients having a relatively large value is reduced, image compression efficiency may be improved.

2. Process of Predicting Transformation Coefficient in Transformation Coefficient Prediction Mode 1 (FDP_mode_1)

It is assumed that only information of a leftmost column from among information about a residual value res(x,y) of an original residual block and information about a residual value f(x,y) of an incomplete residual block is used, a horizontal intra prediction mode is used to generate a prediction mode, and res(0,y)=0 and res(x,0)≠0. Also, it is assumed that the residual value f(x,y) of the incomplete residual block is generated by replacing a transformation coefficient to be predicted from among transformation coefficients of a leftmost column of a transformation block with 0 and inversely transforming a replaced transformation block. A predictor $fdp_{00}$ of a DC coefficient as shown in Equation 5 may be derived from Equation 4.

$$fdp_{00} = \sigma_{00} = \sum_{y=0}^{M-1} f(0, y). \tag{7}$$

As described above, $fdp_{00}$ (or $\sigma_{00}$) of Equation 7 is proportional to a value of the DC coefficient and has a sign opposite to that of the DC coefficient. Accordingly, $fdp_{00}$ of Equation 7 may be used as a predictor of the DC coefficient from among transformation coefficients of a transformation block of a residual block that is predicted and generated in a horizontal intra prediction mode. It is preferable that a value obtained by multiplying the predictor $fdp_{00}$ of the DC coefficient by a predetermined correction value corr_factor is used as a predictor value. The correction value corr_factor will be explained below.

A predictor $fdp_{0m}$ of a transformation coefficient c (0, m) of a leftmost column from among the transformation coefficients of the transformation block may be calculated by using a dot product of an incomplete residual block corresponding to the leftmost column and a basic component function as shown in Equation 8.

$$fdp_{0m} = \sum_{y=0}^{M-1} f(0, y)*basis\_element_{0m}(0, y). \tag{8}$$

Figure 19:
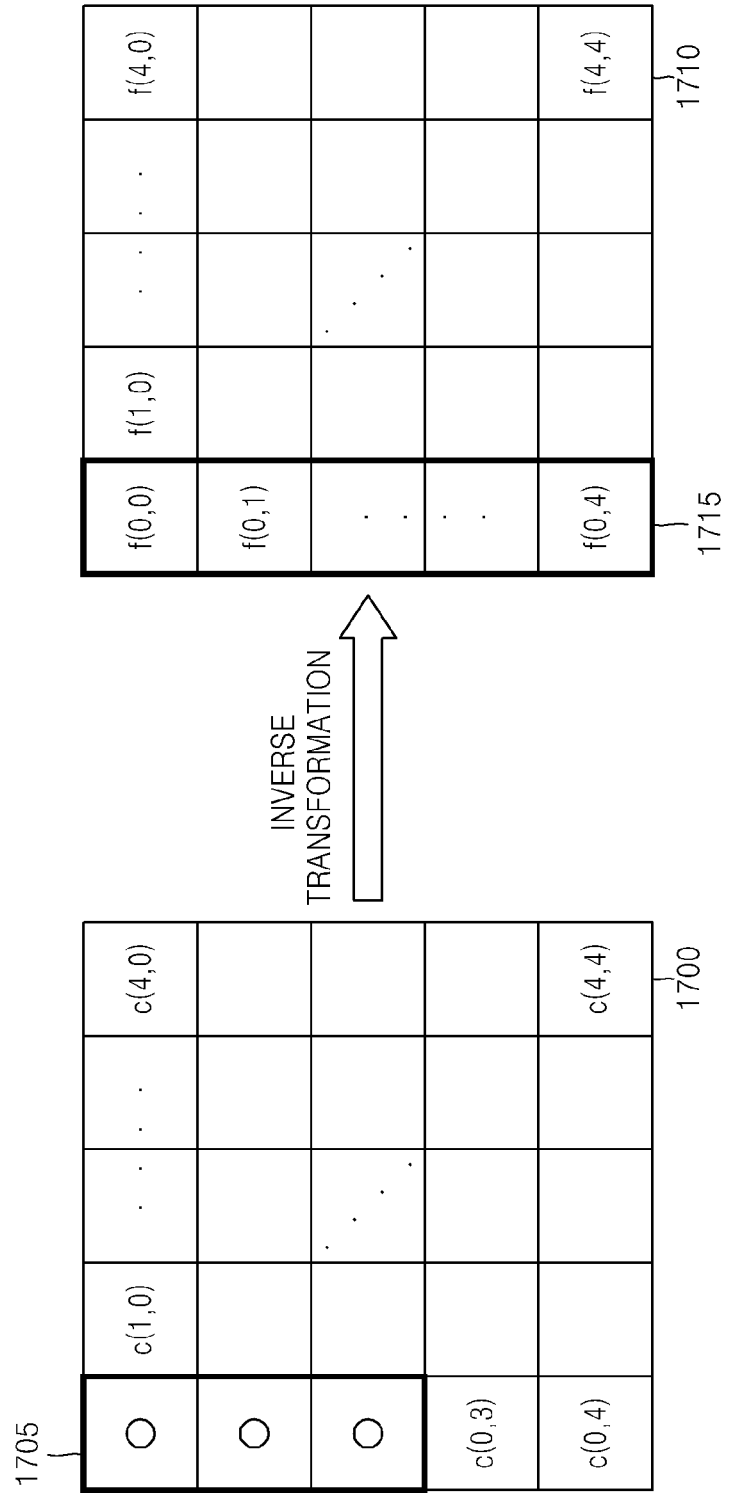
FIG. 19 is a reference diagram for explaining a process of predicting a transformation coefficient in a transformation coefficient prediction mode 1 FDP_mode_1 of FIG. 15.

FIG. 19 is a reference diagram for explaining a process of predicting a transformation coefficient in the transformation coefficient prediction mode 1 FDP_mode_1 of FIG. 15.

In the transformation coefficient prediction mode 1 FDP_mode_1, a predetermined number of transformation coefficients from among transformation coefficients of a leftmost column are predicted. As described above, it is preferable that the transformation coefficient prediction mode 1 FDP_mode_1 is selected when a prediction block is generated in a horizontal intra prediction mode. FIG. 19 illustrates a process of generating predictor values of three transformation coefficients c(0,0), c(0,1), and c(0,2) from among transformation coefficients of a leftmost column.

The transformation coefficient predictor 1220 replaces the three transformation coefficients c(0,0), c(0,1), and c(0,2) to be predicted from among transformation coefficients of a transformation block with 0 as denoted by a reference numeral 1705 and generates a replaced transformation block 1700. The transformation coefficient predictor 1220 generates a second residual block 1710 by inversely transforming the replaced transformation block 1700.

The transformation coefficient predictor 1220 generates predictor values $fdp_{00}$, $fdp_{01}$, and $fdp_{02}$ of the three transformation coefficients $c(0,0)$, $c(0,1)$, and $c(0,2)$ to be predicted by using values 1715 of a leftmost column of the second residual block 1710.

In detail, the transformation coefficient predictor 1220 generates the predictor $fdp_{00}$ of the DC coefficient $c(0,0)$ by using Equation 7 as shown in $$fdp_{00} = \sum_{y=0}^{4} f(0, y).$$

Also, the transformation coefficient predictor 1220 generates the predictor values $fdp_{01}$ and $fdp_{02}$ of the transformation coefficients $c(0,1)$ and $c(0,2)$ of the leftmost column by using Equation 8 as shown in $$fdp_{01} = \sum_{y=0}^{4} f(0, y)^* \text{basis\_element}_{01}(0, y)$$

and $$fdp_{02} = \sum_{y=0}^{4} f(0, y)^* \text{basis\_element}_{02}(0, y).$$

The transformation coefficient predictor 1220 outputs the predictor $fdp_{00}$ of the DC coefficient $c(0,0)$ and the predictor values $fdp_{01}$ and $fdp_{02}$ of the transformation coefficients $c(0,1)$ and $c(0,2)$ of the leftmost column, and the subtractor 1230 calculates and outputs a difference between an original transformation coefficient and a predictor value.

As described above, the transformation coefficient predictor 1220 may output scaling-corrected predictor values obtained by multiplying the predictor $fdp_{00}$ of the DC coefficient $c(0,0)$ and the predictor values $fdp_{01}$ and $fdp_{02}$ of the transformation coefficients $c(0,1)$ and $c(0,2)$ of the leftmost column by a correction value corr_factor.

Figure 20:
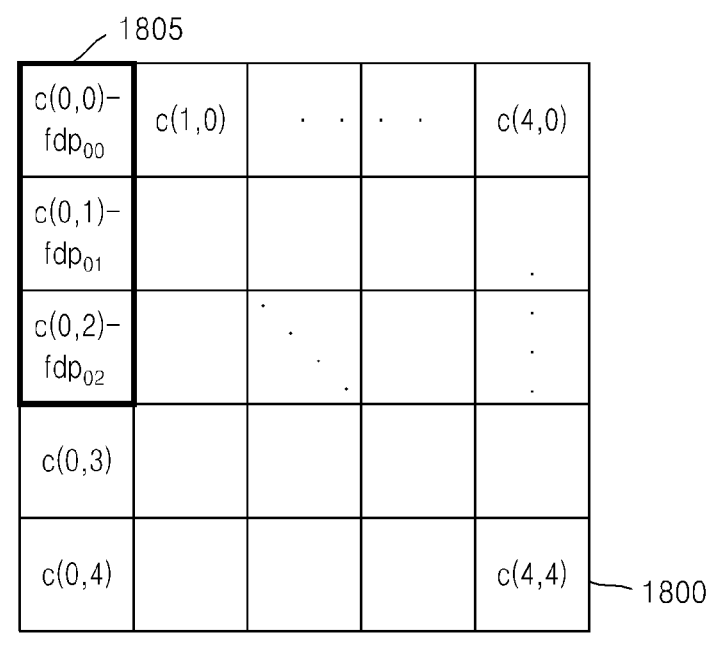

FIG. 20 is a diagram illustrating a transformation block encoded according to a prediction result of a transformation coefficient in the transformation coefficient prediction mode 1 FDP_mode_1.

Referring to FIG. 20, transformation coefficients 1805 to be predicted from among transformation coefficients of a leftmost column of a transformation block 1800 are not encoded and only a difference from a predictor calculated by the transformation coefficient predictor 1220 is encoded. Since the data amount of transformation coefficients having a relatively large value is reduced, image compression efficiency may be improved.

3. Process of Predicting Transformation Coefficient in Transformation Coefficient Prediction Mode 2 (FDP_mode_2)

In Equation 2, since the incomplete residual block is generated by replacing a value of a DC coefficient $coeff_{00}$ to be predicted of a transformation block with '0' and performing discrete cosine transformation, thus there is a difference corresponding to the value of the DC coefficient $coeff_{00}$ set to 0 between a residual value $res(x,y)$ of an original residual block and a residual value $f(x,y)$. When it is assumed that in Equation 4, only information of an uppermost row and a leftmost column from among information about the residual value $res(x,y)$ of the original residual block and information about the residual value $f(x,y)$ of the incomplete residual block is used and $res(x,0)=res(0,y)=0$, a predictor $fdp_{00}$ of the DC coefficient may be calculated as shown in $$fdp_{00} = \sigma_{00} = \sum_{x=0}^{N-1} f(x, 0) + \sum_{y=0}^{M-1} f(0, y). \qquad (9)$$

Since $fdp_{00}(\sigma_{00})$ is proportional to a value of the DC coefficient and has a sign opposite to that of the DC coefficient, $fdp_{00}$ in Equation 9 may be used as a predictor of the DC coefficient. It is preferable that a value obtained by multiplying the predictor $fdp_{00}$ of the DC coefficient by a predetermined correction value corr_factor is used as a predictor value. The correction value corr_factor will be explained below.

Figure 21:
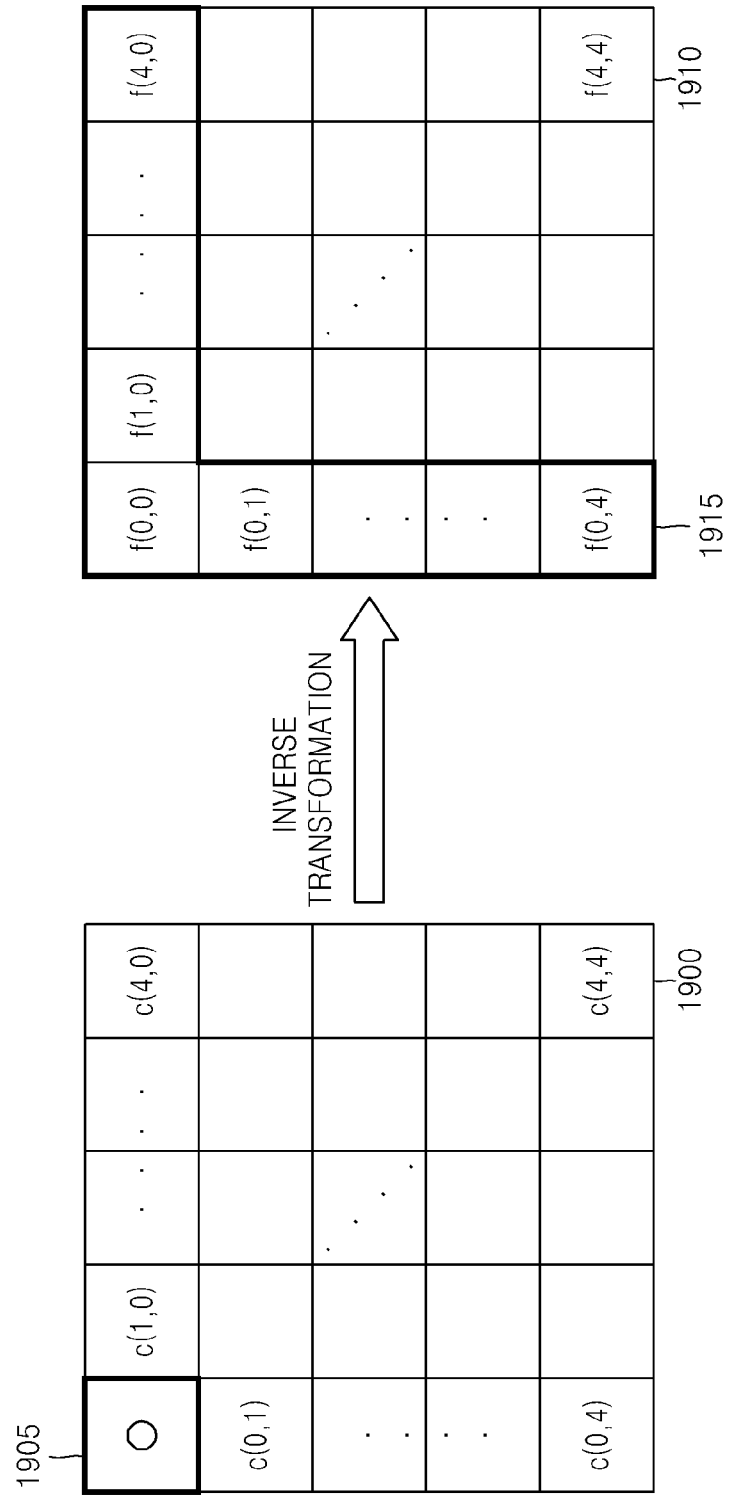
FIG. 21 is a reference diagram for explaining a process of predicting a transformation coefficient in a transformation coefficient prediction mode 2 FDP_mode_2 of FIG. 15.

FIG. 21 is a reference diagram for explaining a process of predicting a transformation coefficient in the transformation coefficient prediction mode 2 (FDP_mode_2) of FIG. 15.

In the transformation coefficient prediction mode 2 (FDP_mode_2), only a DC coefficient from among transformation coefficients is predicted. As described above, it is preferable that the prediction coefficient prediction mode 2 (FDP_mode_2) is selected when a prediction block is generated in a DC mode. FIG. 21 illustrates a process of generating a predictor of a transformation coefficient $c(0,0)$.

The transformation coefficient predictor 1220 replaces the transformation coefficient $c(0,0)$ to be predicted from among transformation coefficients of a transformation block with 0 as denoted by a reference numeral 1905 and generates a replaced transformation block 1900. The transformation coefficient predictor 1220 generates a second residual block 1910 by inversely transforming the replaced transformation block 1900.

The transformation coefficient predictor 1220 generates a predictor $fdp_{00}$ of the transformation coefficient $c(0,0)$ to be predicted by using values 1915 of an uppermost row and a leftmost column of the second residual block 1910.

In detail, the transformation coefficient predictor 1220 generates the predictor $fdp_{00}$ of the DC coefficient $c(0,0)$ by using Equation 9 as shown in $$fdp_{00} = \sum_{x=0}^{N-1} f(x, 0) + \sum_{y=0}^{M-1} f(0, y).$$

The transformation coefficient predictor 1220 outputs the predictor $fdp_{00}$ of the DC coefficient $c(0,0)$, and the subtractor 1230 calculates and outputs a difference between an original transformation coefficient and a predictor value.

As described above, the transformation coefficient predictor 1220 may output a scaling-corrected predictor obtained by multiplying the predictor $fdp_{00}$ of the DC coefficient $c(0,0)$ by a correction value corr_factor.

Figure 22:
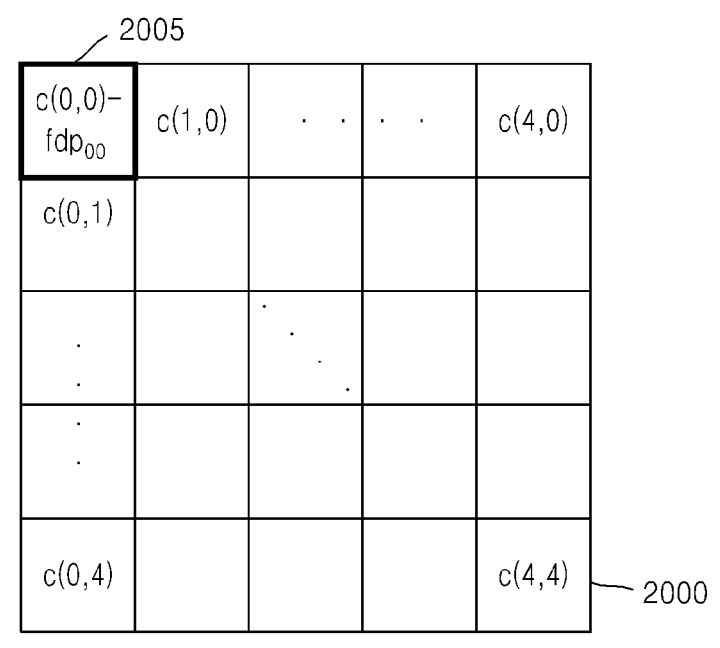

FIG. 22 is a diagram illustrating a transformation block encoded according to a prediction result of a transformation coefficient in the transformation coefficient prediction mode 2 (FDP_mode_2).

Referring to FIG. 22, a DC coefficient 2005 to be predicted of a transformation block 200 is not encoded and only a difference from a predictor calculated by the transformation coefficient predictor 1220 is encoded. Since the data amount of a transformation coefficient having a DC component and having a relatively large value is reduced, image compression efficiency may be improved.

4. Process of Predicting Transformation Coefficient in Transformation Coefficient Prediction Mode 3 (FDP_mode_3)

Unlike the transformation coefficient prediction modes 0 through 2, a transformation coefficient prediction mode 3 (FDP_mode_3) is a mode in which transformation coefficients of an uppermost row and a leftmost column of a transformation block are predicted by using information about a residual value f(x,y) of an incomplete residual block, a value pred(x,y) of a prediction block, and values rec(x,−1) and rec(−1,y) of a neighboring pixel which is previously encoded and restored.

Figure 23:
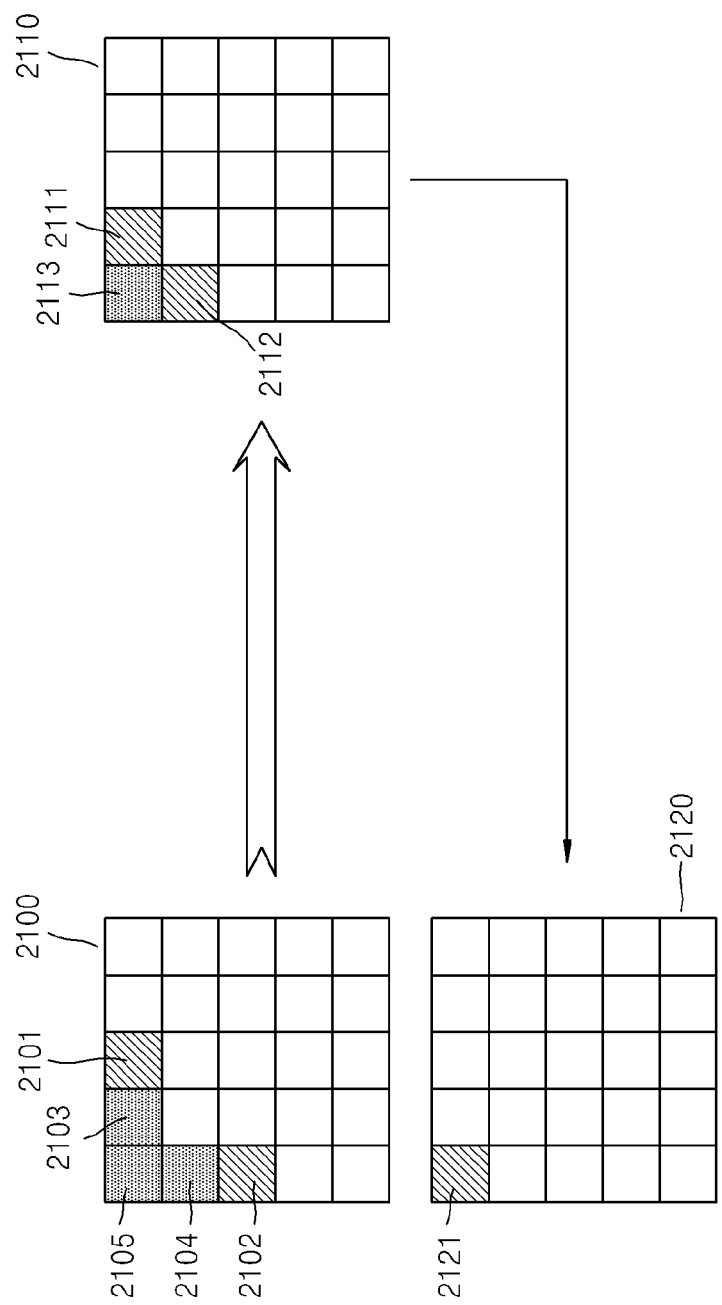
FIG. 23 is a reference diagram illustrating a process of predicting a transformation coefficient in a transformation coefficient prediction mode 3 FDP_mode_3 of FIG. 15.

FIG. 23 is a reference diagram illustrating a process of predicting a transformation coefficient in the transformation coefficient prediction mode 3 (FDP_mode_3) of FIG. 15.

Referring to FIG. 23, a process of predicting a transformation coefficient in the transformation coefficient prediction mode 3 (FDP_mode_3) sequentially generates predictor values from transformation coefficients of a high frequency component to a DC coefficient according to a size of a frequency. A process of predicting transformation coefficients in the transformation coefficient prediction mode 3 (FDP_mode_3) predicts a transformation coefficient such that smoothness between pixels of a current block and a neighboring block that is previously encoded is optimized.

In detail, it is assumed that transformation coefficients 2101 through 2105 of a low frequency component from among transformation coefficients of an uppermost row and a leftmost column of a transformation block 2100 are transformation coefficients to be predicted in the transformation coefficient transformation mode 3 (FDP_mode_3).

The transformation coefficient predictor 1220 generates a second residual block which is an incomplete residual block by replacing the transformation coefficients 2101 through 2105 of a low frequency component to be predicted of the transformation block 2100 with 0 and inversely transforming the replaced transformation block. The transformation coefficient predictor 1220 generates predictor values of first transformation coefficients c(2,0) and c(0,2) of the first transformation coefficients 2101 and 2102 having a largest high frequency component from among the transformation coefficients 2101 through 2105 of the low frequency component to be predicted by using values of an uppermost row and a leftmost column of the second residual block, a value of a prediction block, and values of a neighboring pixel.

Once the predictor values of the first transformation coefficients 2101 and 2102 are generated, the transformation coefficient predictor 1220 generates a third residual block by replacing the transformation coefficients 2111 through 2113 having a frequency component less than the frequency component of the first transformation coefficients from among the transformation coefficients 2101 through 2105 to be predicted of the transformation block with 0 and inversely transforming a replaced transformation block 2110. The transformation coefficient predictor 1220 generates predictor values of second transformation coefficients 2111 and 2112 having a relatively large frequency component from among the transformation coefficients 2111 through 2113 by using values of an uppermost row and a left most column of a third residual block, a value of a prediction block, and values of a neighboring pixel.

Once predictor values of all transformation coefficients of a low frequency component except a DC coefficient 2121 are generated, the transformation coefficient predictor 1220 generates a fourth residual block by replacing only the DC coefficient 2121 from among the transformation coefficients of the transformation block with 0 and inversely transforming a replaced transformation block 2120. The transformation coefficient predictor 1220 generates a predictor of the DC coefficient 2121 by using values of an uppermost row and a leftmost column of the fourth residual block, a value of a prediction block, and values of a neighboring pixel.

A process of predicting transformation coefficients in the transformation coefficient prediction mode 3 FDP_mode_3 is as follows. When a residual value located at (x,y) (0≤x≤N−1, 0≤y≤M−1) of the second residual block is f(x,y), a predictor of a transformation coefficient located at (n,m) of a transformation block is $fdp_{nm}$, a basic component function basis_element$_{nm}$ of discrete cosine transformation is basis_element$_{nm}$=cos(n $_x$x)cos(m $_y$y), a value located at (x,y) of a prediction block is pred(x,y), values of a neighboring block which is restored prior to a current block are rec(x,−1) and rec(−1,y), and first transformation coefficients are transformation coefficient located at (0, L) and (L,0) (L is an integer equal to or greater than 2) of an uppermost row and a leftmost column, the transformation coefficient predictor 1220 calculates parameters $\sigma_{00}$, $\sigma_{0a}$, and $\sigma_{b0}$ as shown in Equation 10.

$$\sigma_{00} = \sum_{x=0}^{N-1}(f(x, 0) + pred(x, 0) - rec(x, -1)) +$$

$$\sum_{y=0}^{M-1}(f(0, y) + pred(0, y) - rec(-1, y))$$

$$\sigma_{0a} = \sum_{y=0}^{M-1}(f(0, y) + pred(0, y) - rec(-1, y))\text{basis\_element}_{0a}(0, y)$$

(where a is an integer from 1 to L), and $$\sigma_{b0} = \sum_{x=0}^{N-1}(f(x, 0) + pred(x, 0) - rec(x, -1))\text{basis\_element}_{b0}(x, 0). \quad (10)$$

(where b is an integer from 1 to L)

The transformation coefficient predictor 1220 generates predictor values $fdp_{L0}$ and $fdp_{0L}$ of the first transformation coefficients by using the parameters $\sigma_{00}$, $\sigma_{0a}$, and $\sigma_{b0}$.

Next, the transformation coefficient predictor 1220 generates a third residual block by replacing transformation coefficients having a frequency component less than a frequency component of the first transformation coefficients from among transformation coefficients to be predicted of the transformation block with 0 and inversely transforming a replaced transformation block. The transformation coefficient predictor 1220 may replace a residual value (x,y) of Equation 10 with a residual value located at (x,y) of the third residual block and may calculate again the parameters $\sigma_{00}$, $\sigma_{0a}$, and $\sigma_{b0}$. In this case, a ranges from 1 to (L−1) and b ranges from 1 to (L−1). The transformation coefficient predictor 1220 generates predictor values $fdp_{L0}$ and $fdp_{0L}$ of second transformation coefficients by using the newly calculated parameters $\sigma_{00}$, $\sigma_{0a}$, and $\sigma_{b0}$. Such a prediction process is repeatedly performed until predictor values of remaining AC transformation coefficients other than the DC coefficient from among the transformation coefficients to be predicted are completely predicted.

Figure 24:
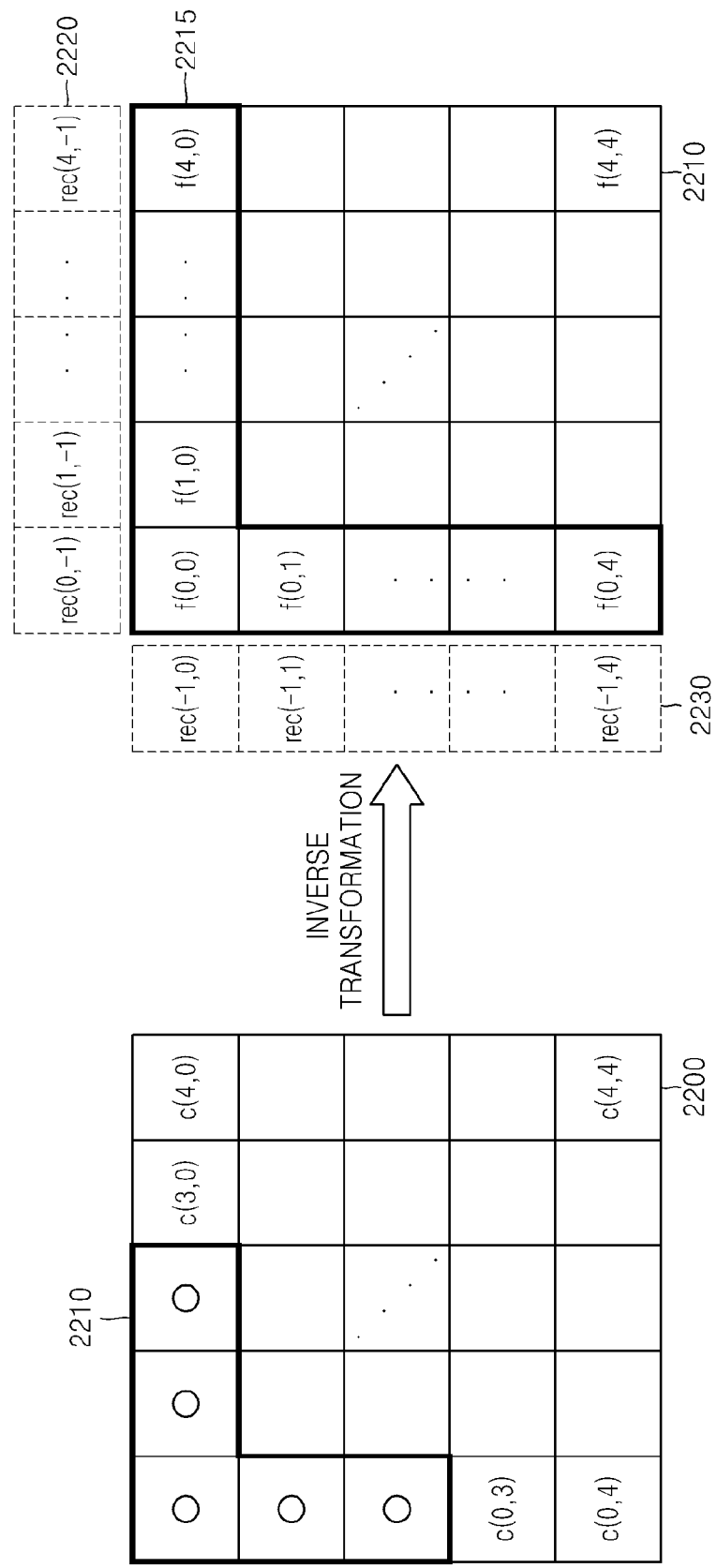
FIGS. 24 through 26 are reference diagrams for explaining a process of predicting a transformation coefficient when L=3 in the transformation coefficient prediction mode 3 FDP_mode_3, according to an exemplary embodiment.
Figure 25:
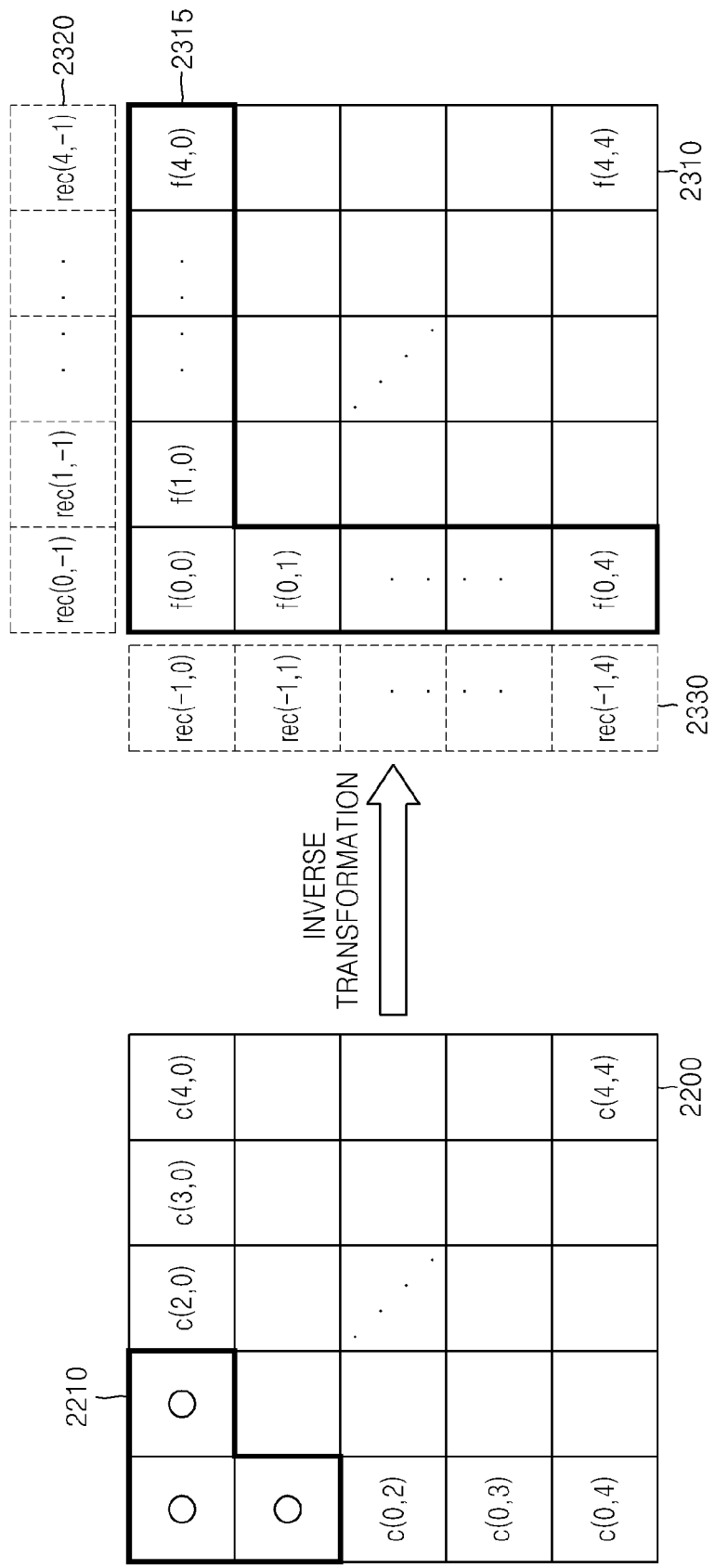
Figure 26:
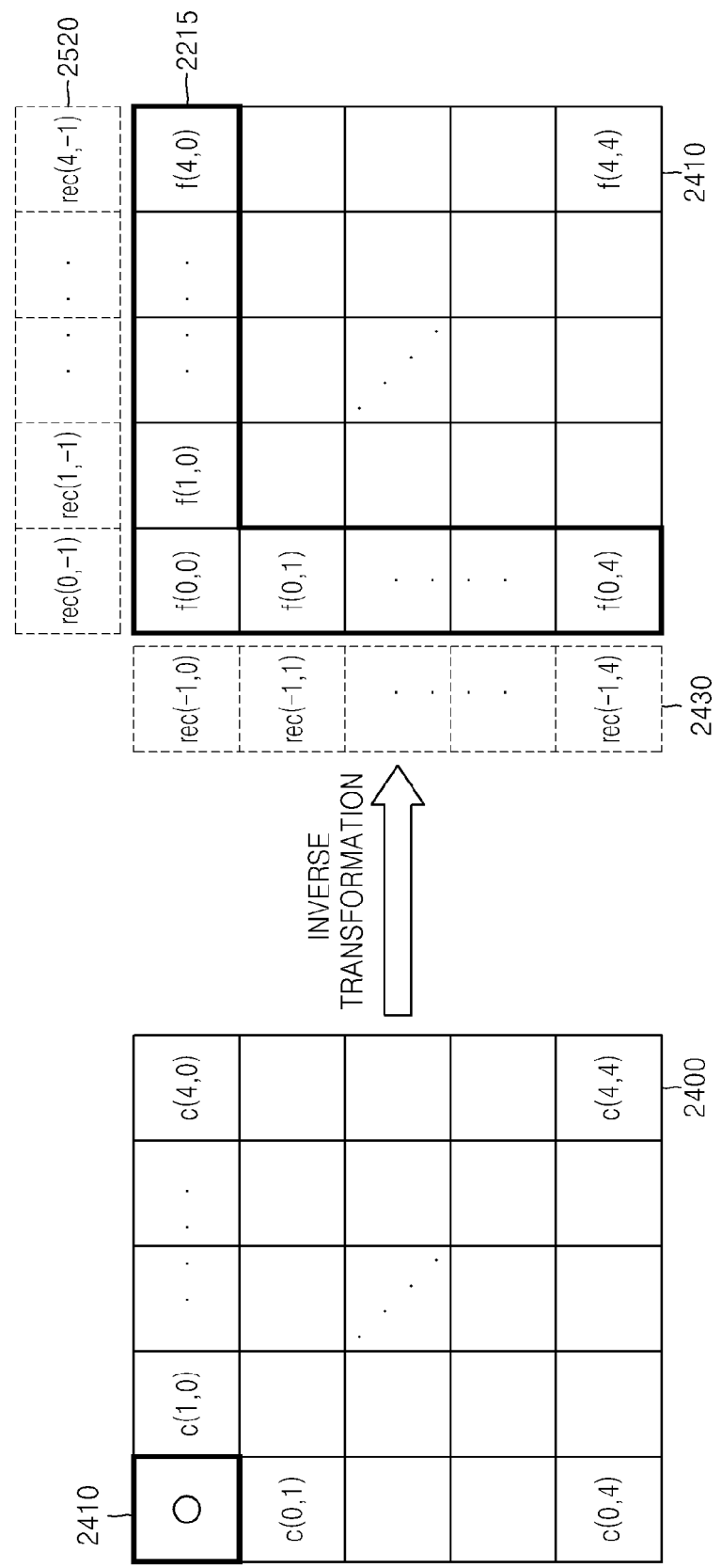

FIGS. 24 through 26 are reference diagrams for explaining a process of predicting a transformation coefficient when L=3 in the transformation coefficient prediction mode 3 FDP- _mode_3. In detail, FIG. 24 is a reference diagram for explaining a process of generating predictor values of first transformation coefficients c(0,2) and c(2,0). FIG. 25 is a reference diagram for explaining a process of generating predictor values of second transformation coefficients c(0,1) and c(1,0). FIG. 26 is a reference diagram for explaining a process of generating a predictor of a DC coefficient c(0,0).

Referring to FIG. 24, the transformation coefficient predictor 1220 replaces transformation coefficients c(0,0), c(0,1), c(1,0), c(0,2), and c(2,0) of an uppermost row and a leftmost column to be predicted from among transformation coefficients of a transformation block with 0 as denoted by a reference numeral 2210 and generates a replaced transformation block 2200. The transformation coefficient predictor 1220 generates a second residual block 2210 by inversely transforming the replaced transformation block 2200.

Next, the transformation coefficient predictor 1220 calculates parameters $\sigma_{00}$, $\sigma_{01}$, $\sigma_{10}$, $\sigma_{02}$, and $\sigma_{20}$ as shown in Equation 11 when L=2 in Equation 10 by using values of an uppermost row and a leftmost column, neighboring pixels 2220 at a top side of the second residual block 2210, and neighboring pixels 2230 at a left side of the second residual block 2210.

$$\sigma_{00} = \sum_{x=0}^{N-1} (f(x,0)|pred(x,0) - rec(x,-1))\text{basis element}_{00}(x,0)|$$

$$\sum_{y=0}^{M-1} (f(0,y)|pred(0,y) - rec(-1,y))\text{basis element}_{00}(0,y)$$

$$\sigma_{01} = \sum_{y=0}^{M-1} (f(0,y) + pred(0,y) - rec(-1,y))\text{basis\_element}_{01}(0,y)$$

$$\sigma_{10} = \sum_{x=0}^{N-1} (f(x,0) + pred(x,0) - rec(x,-1))\text{basis element}_{10}(x,0)$$

$$\sigma_{02} = \sum_{y=0}^{M-1} (f(0,y) + pred(0,y) - rec(-1,y))\text{basis\_element}_{02}(0,y)$$

$$\sigma_{20} = \sum_{x=0}^{N-1} (f(x,0) + pred(x,0) - rec(x,-1))\text{basis\_element}_{20}(x,0). \quad (11)$$

The transformation coefficient predictor 1220 calculates predictor values $fdp_{20}$ and $fdp_{02}$ of the first transformation coefficients c(2,0) and c(0,2) as shown in Equation 12.

$$fdp_{20} = -10\sigma_{00} + 4(\sigma_{01} - \sigma_{10})/\text{basis\_element}_{01}(0,0) + (4\sigma_{02} + 8\sigma_{20})/\text{basis\_element}_{02}(0,0)$$

$$fdp_{02} = -10\sigma_{00} + 4(\sigma_{10} - \sigma_{01})/\text{basis\_element}_{01}(0,0) + (4\sigma_{20} + 8\sigma_{02})/\text{basis\_element}_{02}(0,0) \quad (12)$$

In Equation 12, values by which the parameters $\sigma_{00}$, $\sigma_{01}$, $\sigma_{10}$, $\sigma_{02}$, and $\sigma_{20}$ are multiplied may be determined through experiments and may be changed.

Referring to FIG. 25, after the predictor values $fdp_{20}$ and $fdp_{02}$ of the first transformation coefficient c(0,2) and c(2,0) are generated, the transformation coefficient predictor 1220 generates a third residual block 2310 by replacing transformation coefficients c(0,1), c(1,0) and c(0,0) having a frequency component less than a frequency component of the first transformation coefficients c(0,2) and c(2,0) from among transformation coefficients to be predicted with 0 and inversely transforming a replaced transformation block 2300. Next, the transformation coefficient predictor 1220 newly calculates parameters $\sigma_{00}$, $\sigma_{01}$, and $\sigma_{10}$ as shown in Equation 13 by using values 2315 of an uppermost row and a leftmost column, neighboring pixels 2320 at a top side of the third residual block 2310, and neighboring pixels 2330 at a left side of the third residual block 2310.

$$\sigma_{00} = \sum_{x=0}^{N-1} (f(x,0) + pred(x,0) - rec(x,-1))\text{basis\_element}_{00}(x,0) + \quad (13)$$

$$\sum_{y=0}^{M-1} (f(0,y) + pred(0,y) - rec(-1,y))\text{basis\_element}_{00}(0,y)$$

$$\sigma_{01} = \sum_{y=0}^{M-1} (f(0,y) + pred(0,y) - rec(-1,y))\text{basis\_element}_{01}(0,y)$$

$$\sigma_{10} = \sum_{x=0}^{N-1} (f(x,0) + pred(x,0) - rec(x,-1))\text{basis\_element}_{10}(x,0).$$

The transformation coefficient predictor 1220 calculates predictor values $fdp_{10}$ and $fdp_{01}$ of second transformation coefficients c(1,0) and c(0,1) as shown in Equation 14.

$$fdp_{10} = -6\sigma_{00} + (8\sigma_{01} + 4\sigma_{10})/\text{basis\_element}_{01}(0,0)$$

$$fdp_{01} = -6\sigma_{00} + (8\sigma_{10} + 4\sigma_{01})/\text{basis\_element}_{01}(0,0) \quad (14).$$

In Equation 14, values by which the parameters $\sigma_{00}$, $\sigma_{01}$, and $\sigma_{10}$ are multiplied may be determined through experiments and may be changed.

Referring to FIG. 26, after the predictor values $fdp_{10}$ and $fdp_{01}$ of the second transformation coefficients c(1,0) and c(0,1) are generated, the transformation coefficient predictor 1220 generates a fourth residual block 2410 by replacing a DC coefficient c(0,0) with 0 and inversely transforming a replaced transformation coefficient 2400. Next, the transformation coefficient predictor 1220 newly calculates a parameter $\sigma_{00}$ as shown in Equation 15 by using values 2415 of an uppermost row and a leftmost column, neighboring pixels 2420 at a top side of the fourth residual block 2410, and neighboring pixels 2430 at a left side of the fourth residual block 2410.

$$fdp_{00} = \sigma_{00} = \quad (15)$$

$$\sum_{x=0}^{N-1} (f(x,0) + pred(x,0) - rec(x,-1))\text{basis\_element}_{00}(x,0) +$$

$$\sum_{y=0}^{M-1} (f(0,y) + pred(0,y) - rec(-1,y))\text{basis\_element}_{00}(0,y).$$

$\sigma_{00}$ calculated by using Equation 15 may be used as the predictor $fdp_{00}$ of the DC coefficient. The transformation coefficient predictor 1220 may output scaling-corrected predictor values by multiplying predictor values sequentially predicted in the transformation coefficient prediction mode 3 FDP_mode_3 with a correction value corr_factor.

FIG. 27 is a diagram illustrating a transformation block encoded according to a prediction result of a transformation coefficient in the transformation coefficient prediction mode 3 FDP_mode_3.

Referring to FIG. 27, a DC coefficient 2510 of a transformation block 2500 is not encoded and only a difference from a predictor sequentially calculated by the transformation coefficient predictor 1220 is encoded. Accordingly, since the data amount of a transformation coefficient having a DC component and having a relatively large value is reduced, image compression efficiency may be improved.

As described above, a predictor $fdp_{nm}$, of a transformation coefficient generated in a transformation coefficient prediction mode may be multiplied by a predetermined correction value corr_factor and a resultant value may be used as a final predictor value. The correction value corr_factor may be determined by considering a correlation between the predictor of the transformation coefficient and the final predictor value. The correction value corr_factor is a value determined by considering a correlation between the final predictor and the transformation coefficient which is not replaced or a correlation between the final predictor or an incomplete residual block which is obtained by replacing a transformation coefficient to be predicted from among transformation coefficients of a residual block and inversely transforming a replaced transformation block. The correction value corr_factor may be set as shown in Table 3 in an intra prediction mode, a transformation coefficient prediction mode, a quantization parameter QP, and a position of the transformation coefficient to be predicted. In Table 3, according to the intra prediction mode, the transformation coefficient prediction mode, and the QP value, the correction value corr_factor applicable to a predictor $Coeff_{xy}$ of a transformation coefficient located at (x,y) is shown.

The correction value corr_factor shown in Table 3 is exemplarily shown, and may be changed to another value by considering a correlation between the predictor of the transformation coefficient and the final predictor value.

Figure 28:
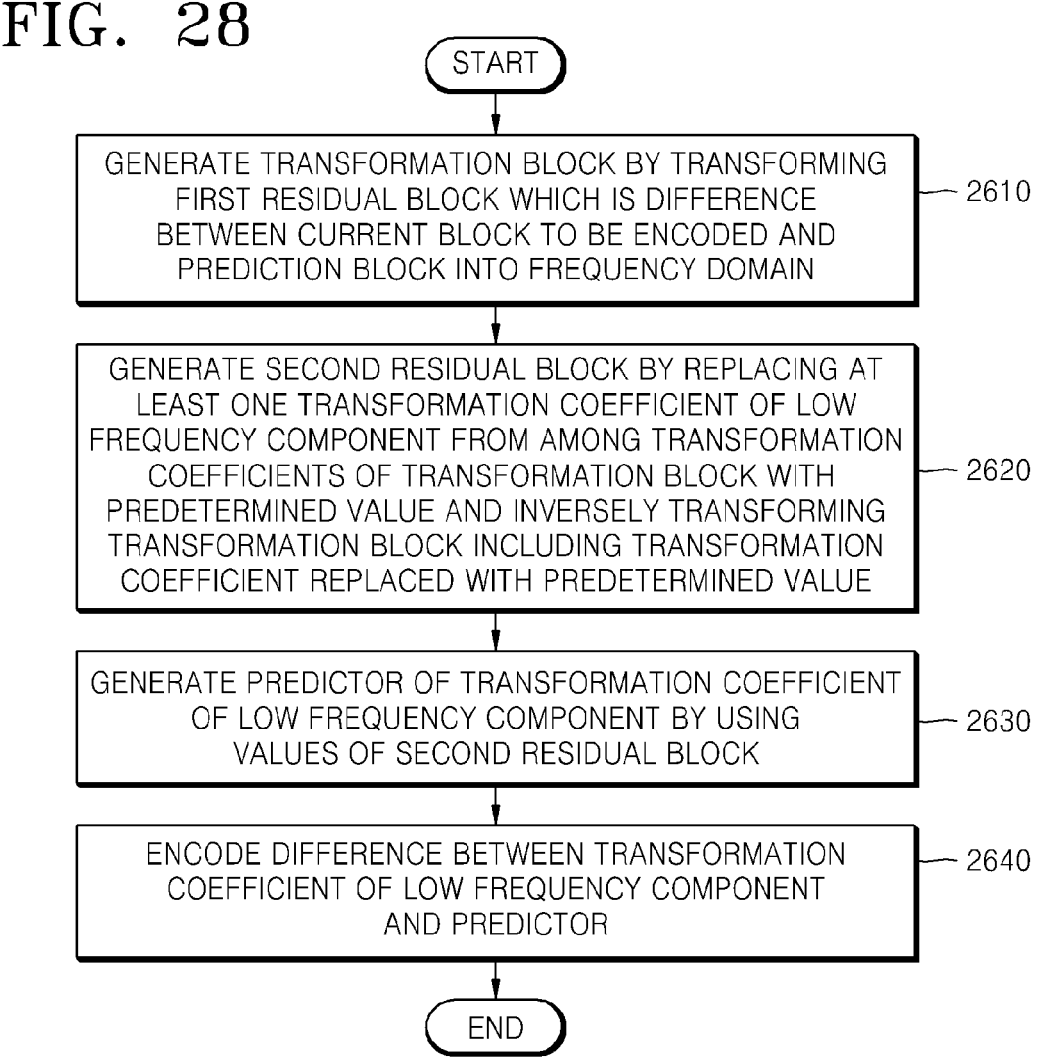
FIG. 28 is a flowchart illustrating a method of encoding an image, according to an exemplary embodiment.

FIG. 28 is a flowchart illustrating a method of encoding an image, according to an exemplary embodiment.

Referring to FIG. 28, in operation 2610, a transformation block is generated by transforming a first residual block, which is a difference between a current block to be encoded and a prediction block, into a frequency domain.

In operation 2620, a second residual block is generated by replacing at least one transformation coefficient having a low frequency component to be predicted from among transformation coefficients of the transformation block with a predetermined value and inversely transforming the transformation block including the transformation coefficient replaced with the predetermined value. The predetermined value may be 0 as described above.

In operation 2630, a predictor of the transformation coefficient having the low frequency component to be predicted is generated by using values of a second residual block. As described above, the transformation coefficient predictor 1220 generates the predictor of the transformation coefficient by linearly combining a basic component function and at least one of an uppermost row and a leftmost column of the second residual block in a transformation coefficient prediction

TABLE 3

| | | corr_factor | | |
|---|---|---|---|---|
| Direction | QP range | $coeff_{00}$ | $coeff_{01}, coeff_{10}$ | $coeff_{02}, coeff_{20}$ |
| Vertical or Horizontal | QP ≤ 22 | $\dfrac{160}{16384 \cdot basis\_element(0, 0)}$ | | |
| | 22 < QP ≤ 27 | $\dfrac{2208 - 64*QP}{5 \cdot 16384 \cdot basis\_element(0, 0)}$ | | |
| | 27 < QP ≤ 32 | $\dfrac{1776 - 48*QP}{5 \cdot 16384 \cdot basis\_element(0, 0)}$ | | |
| | 32 < QP ≤ 37 | $\dfrac{752 - 16*QP}{5 \cdot 16384 \cdot basis\_element(0, 0)}$ | | |
| No predominant direction, only DC coefficient is under prediction | QP ≤ 22 | $\dfrac{96}{16384}$ | | |
| | 22 ≤ QP ≤ 27 | $\dfrac{1184 - 32*QP}{5 \cdot 16384}$ | | |
| | 27 < QP ≤ 32 | $\dfrac{1184 - 32*QP}{5 \cdot 16384}$ | | |
| | 32 < QP ≤ 37 | $\dfrac{672 - 16*QP}{5 \cdot 16384}$ | | |
| No predominant direction, both DC and AC coefficients are under prediction | QP ≤ 22 | $\dfrac{38}{10000}$ | $\dfrac{86}{100000}$ | $\dfrac{45}{100000}$ |
| | 22 < QP ≤ 27 | $\dfrac{564 - 17QP}{50000}$ | $\dfrac{1222 - 36QP}{500000}$ | $\dfrac{577 - 16QP}{500000}$ |
| | 27 < QP ≤ 32 | $\dfrac{402 - 11QP}{50000}$ | $\dfrac{898 - 24QP}{500000}$ | $\dfrac{604 - 17QP}{500000}$ |
| | 32 < QP ≤ 37 | $\dfrac{146 - 3QP}{50000}$ | $\dfrac{450 - 10QP}{500000}$ | $\dfrac{252 - 6QP}{500000}$ | mode FDP_mode. In the transformation coefficient prediction mode 3, a value of the prediction block and a value of a neighboring block may also be used to predict the transformation coefficient.

In operation 2640, a difference between a predictor generated as a result of prediction performed on the transformation coefficient and an actual transformation coefficient is calculated and only the difference is encoded and transmitted as encoding information about the transformation coefficient having the low frequency component to be predicted.

Figure 29:
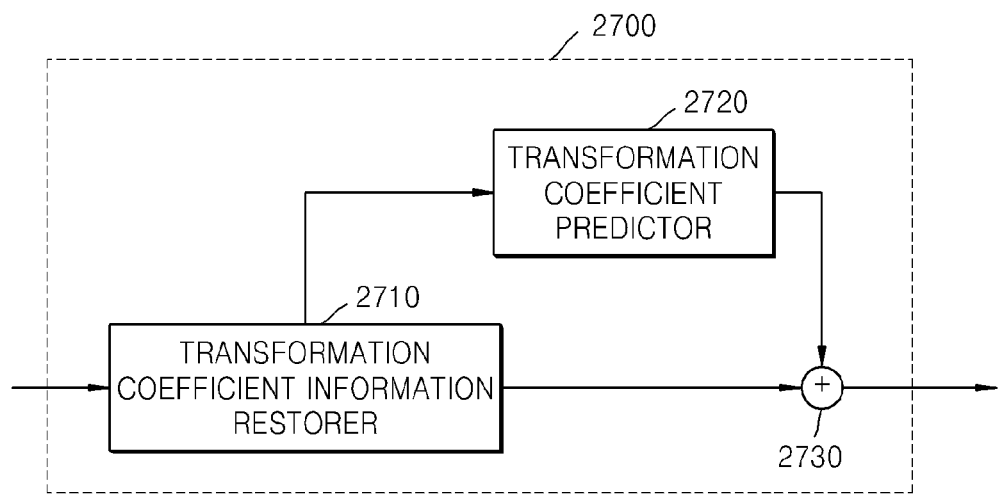
FIG. 29 is a block diagram illustrating an apparatus for performing inverse frequency transformation, according to an exemplary embodiment.

FIG. 29 is a block diagram illustrating an apparatus 2700 for inversely transforming a frequency, according to an exemplary embodiment. The apparatus 2700 of FIG. 29 may be used as the frequency inverse transformer 540 of the apparatus 500 of FIG. 5.

Referring to FIG. 29, the apparatus 2700 includes a transformation coefficient restorer 2710, a transformation coefficient predictor 2720, and an adder 2730.

The transformation coefficient restorer 2710 restores information about a difference between a predictor of a transformation coefficient to be predicted from among transformation coefficients of a transformation block obtained by transforming a first residual block which is a difference between a current block and a prediction block from a bitstream into a frequency domain, and about remaining transformation coefficients other than the predicted transformation coefficient. For example, information about a difference between a predictor and an actual transformation coefficient and information about remaining transformation coefficients other than the predicted transformation coefficient are restored as shown in FIG. 18.

In a transformation coefficient prediction mode applied to a current transformation block, the transformation coefficient predictor 2720 generates a second residual block by replacing a transformation coefficient having a low frequency component of the transformation block with a predetermined value, like the transformation coefficient predictor 1220 of FIG. 14, and inversely transforming the transformation block including the transformation coefficient replaced with the predetermined value, and generates a predictor of the transformation coefficient having the low frequency component by using values of the second residual block.

The adder 2730 restores the transformation coefficient having the low frequency component by adding the difference between the predictor and the transformation coefficient.

FIG. 30 is a flowchart illustrating a method of decoding an image, according to an exemplary embodiment.

Referring to FIG. 30, in operation 2810, a difference between a predictor and at least one transformation coefficient having a low frequency component from among transformation coefficients of a transformation block obtained by transforming a first residual block, which is a difference between a current block and a prediction block, into a frequency domain and remaining transformation coefficients of the transformation block other than the transformation coefficient having the low frequency component are restored.

In operation 2820, a second residual block is generated by replacing the transformation coefficient of the transformation block with a predetermined value and inversely transforming the transformation block including the transformation coefficient replaced with the predetermined value.

In operation 2830, a predictor of the transformation coefficient is generated by using values of the second residual block.

In operation 2840, the transformation coefficient is restored by adding the difference from the predictor value.

According to aspects of one or more exemplary embodiments, since the data amount of a transformation coefficient having a low frequency component and having a relatively large value from among transformation coefficients is reduced through prediction of the transformation coefficient in a frequency domain, image compression efficiency may be improved.

One or more exemplary embodiments may be embodied as computer-readable codes in a computer-readable recording medium. The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. The computer-readable recording medium may be distributed among computer systems that are interconnected through a network, and one or more exemplary embodiments may be stored and implemented as computer-readable codes in the distributed system.

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the invention is defined not by the detailed description of exemplary embodiments, but by the appended claims, and all differences within the scope will be construed as being included in the present invention.

The invention claimed:

1. A method of encoding an image, the method comprising:
generating a first transformation block by transforming a first residual block into a frequency domain, the first residual block being a difference between a current block to be encoded and a prediction block;
generating a second residual block by inversely transforming a second transformation block that is obtained by replacing a transformation coefficient of a first region, from among transformation coefficients of the generated first transformation block, with a predetermined value;
generating, by using the generated second residual block, a predictor of the transformation coefficient of the first region without generating predictors of remaining transformation coefficients whose values are not replaced by the predetermined value, from among the transformation coefficients of the generated first transformation block; and
encoding an input image by generating a predicted first region by using the generated predictor and the transformation coefficient of the first region and generating a third transformation block including the predicted first region.

2. The method of claim 1, wherein the predetermined value is 0.

3. The method of claim 1, wherein the predicted first region is generated by using a difference between the generated predictor and the transformation coefficient of the first region.

4. The method of claim 1, wherein the transformation coefficient of the first region is determined in an intra prediction mode used to generate the prediction block.

5. The method of claim 1, wherein the generating of the predictor comprises generating the predictor by using at least one of a prediction mode used to generate the prediction block, the generated second residual block, and a neighboring block.

6. The method of claim 1, wherein:
when the prediction block is generated through intra prediction in a direct current (DC) mode, the transformation coefficient of the first region is a DC coefficient; and
the generating of the predictor of the transformation coefficient comprises generating a predictor of the DC coefficient by using values of an uppermost row and a leftmost column of the generated second residual block.

7. The method of claim 6, wherein the generating of the predictor of the transformation coefficient of the first region comprises:
when sizes of the current block, the prediction block, the generated first transformation block, the first residual block, and the generated second residual block are N×M, where N and M are integers, a residual value located at (x,y), where $0 \leq x \leq N-1$ and $0 \leq y \leq M-1$, of the generated second residual block is f(x,y), and a predictor of a transformation coefficient located at (n,m) of the generated first transformation block is $fdp_{nm}$, generating a predictor $fdp_{00}$ of the DC coefficient according to $$fdp_{00} = \sum_{x=0}^{N-1} f(x, 0) + \sum_{y=0}^{M-1} f(0, y).$$

8. The method of claim 1, wherein:
when the prediction block is generated through intra prediction in a vertical mode, one of transformation coefficients of an uppermost row is selected as the transformation coefficient of the first region; and
the generating of the predictor of the transformation coefficient comprises generating a predictor of the selected one of the transformation coefficients of the uppermost row by using values of an uppermost row of the generated second residual block.

9. The method of claim 8, wherein the generating of the predictor of the transformation coefficient comprises, when sizes of the current block, the prediction block, the generated first transformation block, the first residual block, and the generated second residual block are N×M, where N and M are integers, a residual value located at (x,y), where $0 \leq x \leq N-1$ and $0 \leq y \leq M-1$, of the generated second residual block is f(x,y), a predictor of a transformation coefficient located at (n,m) of the generated first transformation block is $fdp_{nm}$, and a basic component function $basis\_element_{nm}$ of discrete cosine transformation is $basis\_element_{nm}=\cos(n\,_x x)\cos(m\,_y y)$:
generating a predictor $fdp_{00}$ of the DC coefficient according to $$fdp_{00} = \sum_{x=0}^{N-1} f(x, 0);$$

and
generating predictor values $fdp_{n0}$ of the transformation coefficients of the uppermost row according to $$fdp_{n0} = \sum_{x=0}^{N-1} f(x, 0) * basis\_element_{n0}(x, 0).$$

10. The method of claim 1, wherein:
when the prediction block is generated through intra prediction in a horizontal mode, one of transformation coefficients of a leftmost column is selected as the transformation coefficient of the first region; and
the generating of the predictor of the transformation coefficient comprises generating a predictor of the selected one of the transformation coefficients of the leftmost column by using values of a leftmost column of the generated second residual block.

11. The method of claim 10, wherein the generating of the predictor of the transformation coefficient comprises, when sizes of the current block, the prediction block, the generated first transformation block, the first residual block, and the generated second residual block are N×M, where N and M are integers, a residual value located at (x,y), where $0 \leq x \leq N-1$, $0 \leq y \leq M-1$, of the generated second residual block is f(x,y), a predictor of a transformation coefficient located at (n,m) of the generated first transformation block is $fdp_{nm}$, and a basic component function $basis\_element_{nm}$ of discrete cosine transformation is $basis\_element_{nm}=\cos(n\,_x x)\cos(m\,_y y)$:
generating a predictor $fdp_{00}$ of the DC coefficient according to $$fdp_{00} = \sum_{y=0}^{M-1} f(0, y);$$

and
generating predictor values $fdp_{0m}$ of the transformation coefficients of the leftmost column according to $$fdp_{0m} = \sum_{y=0}^{M-1} f(0, y) * basis\_element_{0m}(0, y).$$

12. The method of claim 1, wherein:
the transformation coefficient of the first region comprises transformation coefficients of an uppermost row and transformation coefficients of a leftmost column; and
the generating of the predictor of the transformation coefficient to be predicted comprises generating predictor values of first transformation coefficients having a largest high frequency component from among transformation coefficients to be predicted by using values of the generated second residual block and values of the prediction block.

13. The method of claim 12, wherein the generating of the predictor values of the first transformation coefficients comprises, when sizes of the current block, the prediction block, the generated first transformation block, the first residual block, and the generated second residual block are N×M, where N and M are integers, a residual value located at (x,y), where $0 \leq x \leq N-1$ and $0 \leq y \leq M-1$, of the generated second residual block is f(x,y), a predictor of a transformation coefficient located at (n,m) of the generated first transformation block is $fdp_{nm}$, a basic component function $basis\_element_{nm}$ of discrete cosine transformation is $basis\_element_{nm}=\cos(n\,_x x)\cos(m\,_y y)$, a value located at (x,y) of the prediction block is pred(x,y), values of a neighboring block that is restored prior to the current block are rec(x,−1) and rec(−1,y), and the first transformation coefficients are transformation coefficients located at (0,L) and (L,0), where L is an integer equal to or greater than 2, of the uppermost row and the leftmost column:

calculating parameters $\sigma_{00}$, $\sigma_{0a}$ and $\sigma_{b0}$ according to:

$$\sigma_{00} = \sum_{x=0}^{N-1}(f(x,0)+pred(x,0)-rec(x,-1))+$$

$$\sum_{y=0}^{M-1}(f(0,y)+pred(0,y)-rec(-1,y)),$$

$$\sigma_{0a} = \sum_{y=0}^{M-1}(f(0,y)+pred(0,y)-rec(-1,y))\text{basis\_element}_{0a}(0,y),$$

(where a is an integer from 1 to $L$), and $$\sigma_{b0} = \sum_{x=0}^{N-1}(f(x,0)+pred(x,0)-rec(x,-1))\text{basis\_element}_{b0}(x,0),$$

where b is an integer from 1 to L; and generating predictor values $fdp_{L0}$ and $fdp_{0L}$ of the first transformation coefficients by using the calculated parameters $\sigma_{00}$, $\sigma_{0a}$ and $\sigma_{b0}$.

14. The method of claim 12, further comprising:

generating a third residual block by replacing transformation coefficients having a frequency component less than a frequency component of the first transformation coefficients from among the transformation coefficients of the first region of the generated first transformation block with the predetermined value and inversely transforming the replaced transformation block;

generating predictor values of second transformation coefficients having a largest frequency component from among the transformation coefficients having the frequency component less than the frequency component of the first transformation coefficients by using values of the generated third residual block and values of the prediction block; and encoding differences of the predictor values of the first transformation coefficients and the second transformation coefficients.

15. The method of claim 14, wherein the generating of the predictor values of the second transformation coefficients comprises, when sizes of the current block, the prediction block, the generated first transformation block, the first residual block, and the generated second residual block are N×M, where N and M are integers, a residual value located at (x,y), where $0 \leq x \leq N-1$, $0 \leq y \leq M-1$ of the generated second residual block is f(x,y), a predictor of a transformation coefficient located at (n,m) of the generated first transformation block is $fdp_{nm}$, and a basic component function basis\_element$_{nm}$ of discrete cosine transformation is basis\_element$_{nm}$=cos(n $_x$x)cos(m $_y$y),), a value located at (x,y) of the prediction block is pred(x,y), values of a neighboring block that is restored prior to the current block are rec(x,−1) and rec(−1,y), the first transformation coefficients are transformation coefficients located at (0,L) and (L,0), where L is an integer equal to or greater than 2, of the uppermost row and the leftmost column, and the second transformation coefficients are transformation coefficients located at (0,L−1) and (L−1,0) of the uppermost row and the leftmost column:

calculating parameters $\sigma_{00}$, $\sigma_{0a}$ and $\sigma_{b0}$ according to:

$$\sigma_{00} = \sum_{x=0}^{N-1}(f(x,0)+pred(x,0)-rec(x,-1))+$$

$$\sum_{y=0}^{M-1}(f(0,y)+pred(0,y)-rec(-1,y)),$$

$$\sigma_{0a} = \sum_{y=0}^{M-1}(f(0,y)+pred(0,y)-rec(-1,y))\text{basis\_element}_{0a}(0,y),$$

(where a is an integer from 1 to $L-1$), and $$\sigma_{b0} = \sum_{x=0}^{N-1}(f(x,0)+pred(x,0)-rec(x,-1))\text{basis\_element}_{b0}(x,0),$$

where b is an integer from 1 to L-1; and generating predictor values $fdp_{L-1,0}$ and $fdp_{0,L-}$ of the second transformation coefficients by using the calculated parameters $\sigma_{00}$, $\sigma_{0a}$ and $\sigma_{b0}$.

16. A method of decoding an image, the method comprising:

restoring an original transformation coefficient of a second region, other than a transformation coefficient of a first region, and a difference between the transformation coefficient of the first region and a predictor of the transformation coefficient of the first region, from among transformation coefficients of a transformation block that is obtained by transforming a first residual block into a frequency domain, the first residual block being a difference between a current block and a prediction block;

replacing the transformation coefficient of the first region with a predetermined value, and generating a second residual block by using a replaced transformation block including the original transformation coefficient of the second region and the replaced transformation coefficient of the first region;

generating, by using the generated second residual block, a predictor of the transformation coefficient of the first region without generating predictors of transformation coefficients of the second region; and restoring the transformation coefficient of the first region by adding the restored difference from the predictor and the transformation coefficient of the first region.

17. The method of claim 16, wherein the predetermined value is 0.

18. The method of claim 16, wherein the generating of the second residual block comprises generating the second residual block by inversely transforming the replaced transformation block.

19. The method of claim 16, wherein the transformation coefficient to be predicted is determined in an intra prediction mode used to generate the prediction block.

20. The method of claim 16, wherein the generating of the predictor comprises generating the predictor by using at least one of a prediction mode used to generate the prediction block, the generated second residual block, and a neighboring pixel.

21. The method of claim 16, wherein:

when the prediction block is generated through intra prediction in a direct current (DC) mode, a DC coefficient is selected as the transformation coefficient of the first region; and the generating of the predictor of the transformation coefficient of the first region comprises generating a predictor of the DC coefficient by using values of an uppermost row and a leftmost column of the generated second residual block.

22. The method of claim 21, wherein the generating of the predictor of the transformation coefficient of the first region comprises, when sizes of the current block, the prediction block, the transformation block, the first residual block, and the generated second residual block are N×M, where N and M are integers, a residual value located at (x,y), where 0≤x≤N−1 and 0≤y≤M−1, of the generated second residual block is f(x,y), and a predictor of a transformation coefficient located at (n,m) of the transformation block is $fdp_{nm}$:

generating a predictor $fdp_{00}$ of the DC coefficient according to $$fdp_{00} = \sum_{x=0}^{N-1} f(x, 0) + \sum_{y=0}^{M-1} f(0, y).$$

23. The method of claim 16, wherein:
when the prediction block is generated through intra prediction in a vertical mode, one of transformation coefficients of an uppermost row is selected as the transformation coefficient of the first region; and
the generating of the predictor of the transformation coefficient comprises generating a predictor of the selected one of the transformation coefficients of the uppermost row by using values of an uppermost row of the generated second residual block.

24. The method of claim 23, wherein the generating of the predictor of the transformation coefficient comprises, when sizes of the current block, the prediction block, the transformation block, the first residual block, and the generated second residual block are N×M, where N and M are integers, a residual value located at (x,y), where 0≤x≤N−1 and 0≤y≤M−1, of the generated second residual block is f(x,y), a predictor of a transformation coefficient located at (n,m) of the transformation block is $fdp_{nm}$, and a basic component function $basis\_element_{nm}$ of discrete cosine transformation is $basis\_element_{nm}=\cos(n_x x)\cos(m_y y)$:

generating a predictor $fdp_{00}$ of the DC coefficient according to $$fdp_{00} = \sum_{x=0}^{N-1} f(x, 0);$$

and
generating predictor values $fdp_{n0}$ of the transformation coefficients of the uppermost row according to $$fdp_{n0} = \sum_{x=0}^{N-1} f(x, 0) * basis\_element_{n0}(x, 0).$$

25. The method of claim 16, wherein:
when the prediction block is generated through intra prediction in a horizontal mode, one of transformation coefficients of a leftmost column is selected as the transformation coefficient of the first region; and
the generating of the predictor of the transformation coefficient comprises generating a predictor of the selected one of the transformation coefficients of the leftmost column by using values of a leftmost column of the generated second residual block.

26. The method of claim 25, wherein the generating of the predictor of the transformation coefficient comprises, when sizes of the current block, the prediction block, the transformation block, the first residual block, and the generated second residual block are N×M, where N and M are integers, a residual value located at (x,y), where 0≤x≤N−1 and 0≤y≤M−1, of the generated second residual block is f(x,y), a predictor of a transformation coefficient located at (n,m) of the transformation block is $fdp_{nm}$, and a basic component function $basis\_element_{nm}$ of discrete cosine transformation is $basis\_element_{nm}=\cos(n_x x)\cos(m_y y)$:

generating a predictor $fdp_{00}$ of the DC coefficient according to $$fdp_{00} = \sum_{y=0}^{M-1} f(0, y);$$

and generating predictor values $fdp_{0m}$ of the transformation coefficients of the leftmost column according to $$fdp_{0m} = \sum_{y=0}^{M-1} f(0, y) * basis\_element_{0m}(0, y).$$

27. The method of claim 16, wherein:
the transformation coefficient of the first region comprises transformation coefficients of an uppermost row and transformation coefficients of a leftmost column; and
the generating of the predictor of the transformation coefficient to be predicted comprises generating predictor values of first transformation coefficients having a largest high frequency component from among the transformation coefficients to be predicted by using values of the generated second residual block and values of the prediction block.

28. The method of claim 27, wherein the generating of the predictor values of the first transformation coefficients comprises, when sizes of the current block, the prediction block, the transformation block, the first residual block, and the generated second residual block are N×M, where N and M are integers, a residual value located at (x,y), where 0≤x≤N−1 and 0≤y≤M−1, of the generated second residual block is f(x,y), a predictor of a transformation coefficient located at (n,m) of the transformation block is $fdp_{nm}$, a basic component function $basis\_element_{nm}$ of discrete cosine transformation is $basis\_element_{nm}=\cos(n_x x)\cos(m_y y)$, a value located at (x,y) of the prediction block is pred(x,y), values of a neighboring block that is restored prior to the current block are rec(x,−1) and rec(−1,y), and the first transformation coefficients are transformation coefficients located at (0,L) and (L,0), where L is an integer equal to or greater than 2, of the uppermost row and the leftmost column:

calculated parameters $\sigma_{00}$, $\sigma_{0a}$ and $\sigma_{b0}$ according to $$\sigma_{00} = \sum_{x=0}^{N-1}(f(x,0) + pred(x,0) - rec(x,-1)) +$$

$$\sum_{y=0}^{M-1}(f(0,y) + pred(0,y) - rec(-1,y)),$$

$$\sigma_{0a} = \sum_{y=0}^{M-1}(f(0,y) + pred(0,y) - rec(-1,y))\text{basis\_element}_{0a}(0,y),$$

where a is an integer from 1 to $L-1$, and $$\sigma_{b0} = \sum_{x=0}^{N-1}(f(x,0) + pred(x,0) - rec(x,-1))\text{basis\_element}_{b0}(x,0),$$

where b is an integer from 1 to L; and
generating predictor values $\text{fdp}_{L0}$ and $\text{fdp}_{0L}$ of the first transformation coefficient by using the calculated parameters $\sigma_{00}$, $\sigma_{0a}$ and $\sigma_{b0}$.

29. The method of claim 27, further comprising:
generating a third residual block by replacing transformation coefficients having a frequency component less than a frequency component of the first transformation coefficients from among the transformation coefficients of the first region with the predetermined value and inversely transforming the replaced transformation block;
generating predictor values of second transformation coefficients having a largest frequency component from among the transformation coefficients having the frequency component less than the frequency component of the first transformation coefficients by using values of the generated third residual block and values of the prediction block; and
restoring the first transformation coefficients and the second transformation coefficients by adding differences of the predictor values of the first transformation coefficients and the second transformation coefficients.

30. The method of claim 29, wherein the generating of the predictor values of the second transformation coefficients comprises, when sizes of the current block, the prediction block, the transformation block, the first residual block, and the generated second residual block are N×M, where N and M are integers, a residual value located at (x,y), where $0 \leq x \leq N-1$ and $0 \leq y \leq M-1$, of the generated second residual block is f(x,y), a predictor of a transformation coefficient located at (n,m) of the transformation block is $\text{fdp}_{nm}$, a basic component function $\text{basis\_element}_{nm}$ of discrete cosine transformation is $\text{basis\_element}_{nm} = \cos(n_x x)\cos(m_y y)$, a value located at (x,y) of the prediction block is pred(x,y), values of a neighboring block that is restored prior to the current block are rec(x,−1) and rec(−1,y), the first transformation coefficients are transformation coefficients located at (0,L) and (L,0), where L is an integer equal to or greater than 2, of the uppermost row and the leftmost column, and the second transformation coefficients are transformation coefficients located at (0,L−1) and (L−1,0) of the uppermost row and the leftmost column:
calculating parameters $\sigma_{00}$, $\sigma_{0a}$ and $\sigma_{b0}$ according to $$\sigma_{00} = \sum_{x=0}^{N-1}(f(x,0) + pred(x,0) - rec(x,-1)) +$$

$$\sum_{y=0}^{M-1}(f(0,y) + pred(0,y) - rec(-1,y)),$$

-continued $$\sigma_{0a} = \sum_{y=0}^{M-1}(f(0,y) + pred(0,y) - rec(-1,y))\text{basis\_element}_{0a}(0,y),$$

where a is an integer from 1 to $L-1$, and $$\sigma_{b0} = \sum_{x=0}^{N-1}(f(x,0) + pred(x,0) - rec(x,-1))\text{basis\_element}_{b0}(x,0),$$

where b is an integer from 1 to L−1; and
generating predictor values $\text{fdp}_{L-1,0}$ and $\text{fdp}_{0,L-1}$ of the second transformation coefficients by using the calculated parameters $\sigma_{00}$, $\sigma_{0a}$ and $\sigma_{b0}$.

31. An apparatus for encoding an image, the apparatus comprising:
a transformer which generates a transformation block by transforming a first residual block into a frequency domain, the first residual block being a difference between a current block to be encoded and a prediction block;
a transformation coefficient predictor which replaces a transformation coefficient of a first region from among transformation coefficients of the transformation block with a predetermined value, generates a second residual block by using a replaced transformation block including an original transformation coefficient of a second region other than the first region and the replaced transformation coefficient of the first region, and generates, by using the generated second residual block, a predictor of the transformation coefficient of the first region without generating predictors of remaining transformation coefficients whose values are not replaced by the predetermined value, from among the transformation coefficients of the generated first transformation;
a subtractor which calculates a difference between the transformation coefficient of the first region and the predictor of the transformation coefficient of the first region; and
an encoder which encodes the transformation block including the original transformation coefficient of the second region and the difference.

32. An apparatus for decoding an image, the apparatus comprising:
a transformation coefficient information restorer which restores an original transformation coefficient of a second region, other than a transformation coefficient of a first region, and a difference between the transformation coefficient of the first region and a predictor of the transformation coefficient of the first region, from among transformation coefficients of a transformation block that is obtained by transforming a first residual block into a frequency domain, the first residual block being a difference between a current block and a prediction block;
a transformation coefficient predictor which replaces the transformation coefficient of the first region with a predetermined value, generates a second residual block by using a replaced transformation block including the original transformation coefficient of the second region and the replaced transformation coefficient of the first region, and generates, by using the generated second residual block, the predictor of the transformation coefficient of the first region without generating predictors of transformation coefficients of the second region; and an adder which restores the transformation coefficient to be predicted by adding the difference from the predictor value.

33. A method of decoding an image, the method comprising:
- receiving information about a prediction region and about a first transformation block that comprises the prediction region and is subjected to frequency transformation;
- generating a second transformation block by replacing a transformation coefficient of the prediction region of the first transformation block based on the received information about the prediction region with a predetermined value;
- generating a residual block by inversely transforming the generated second transformation block;
- generating, by using the generated residual block, a predictor of the transformation coefficient of the prediction region without generating predictors of remaining transformation coefficients of the first transformation block; and
- restoring the second transformation block by adding the generated predictor to the prediction region of the first transformation block.

34. A non-transitory computer-readable recording medium having embodied thereon a program for executing the method of claim 1.

35. A non-transitory computer-readable recording medium having embodied thereon a program for executing the method of claim 16.

36. An apparatus for decoding an image, the apparatus comprising:
- an information unit which receives information about a prediction region and about a first transformation block that comprises the prediction region and is subjected to frequency transformation;
- a transformation coefficient predictor which generates a second transformation block by replacing a transformation coefficient of the prediction region of the first transformation block based on the received information about the prediction region with a predetermined value, generates a residual block by inversely transforming the generated second transformation block, and generates, by using the generated residual block, a predictor of the transformation coefficient of the prediction region without generating predictors of remaining transformation coefficients of the first transformation block; and
- an adder which restores the second transformation block by adding the generated predictor to the prediction region of the first transformation block.

37. A non-transitory computer-readable recording medium having embodied thereon a program for executing the method of claim 33.

* * * * *